(12) United States Patent
Sasakura et al.

(10) Patent No.: US 10,718,858 B2
(45) Date of Patent: Jul. 21, 2020

(54) ECHO MEASURING APPARATUS, ECHO SOUNDING APPARATUS, MULTIBEAM ECHO MEASURING APPARATUS, MULTIBEAM ECHO SOUNDING APPARATUS AND APERTURE SYNTHETIC SONAR

(71) Applicant: AquaFusion, Ltd., Hyogo (JP)

(72) Inventors: Toyoki Sasakura, Tokyo (JP); Ikuo Matsuo, Miyagi (JP)

(73) Assignee: AQUAFUSION, LTD., Hyogo (JP)

(*) Notice: Subject to any disclaimer, the term of this patent is extended or adjusted under 35 U.S.C. 154(b) by 360 days.

(21) Appl. No.: 15/748,099

(22) PCT Filed: Sep. 16, 2016

(86) PCT No.: PCT/JP2016/004242
§ 371 (c)(1),
(2) Date: Jan. 26, 2018

(87) PCT Pub. No.: WO2017/158659
PCT Pub. Date: Sep. 21, 2017

(65) Prior Publication Data
US 2018/0217243 A1   Aug. 2, 2018

(30) Foreign Application Priority Data

Mar. 15, 2016 (JP) ................................. 2016-050441
Jul. 13, 2016 (JP) ................................. 2016-138095

(51) Int. Cl.
*G01S 7/52* (2006.01)
*G01S 15/10* (2006.01)
(Continued)

(52) U.S. Cl.
CPC .......... *G01S 7/52003* (2013.01); *G01S 7/527* (2013.01); *G01S 15/104* (2013.01); *G01S 15/89* (2013.01); *G01S 15/8904* (2013.01)

(58) Field of Classification Search
CPC .. G01S 7/52003; G01S 7/527; G01S 15/8904; G01S 15/104; G01S 15/89
See application file for complete search history.

(56) References Cited

U.S. PATENT DOCUMENTS 4,635,240 A * 1/1987 Geohegan, Jr. ......... G01S 15/60
181/123
5,422,860 A * 6/1995 Bradley ................ G01S 15/104
367/89
(Continued)

FOREIGN PATENT DOCUMENTS

CA       3055502 A1 *  9/2018 ............. G01S 15/04
JP       S54-014261 A  2/1979
(Continued)

OTHER PUBLICATIONS

Dec. 13, 2016, International Search Report issued for related international application No. PCT/JP2016/004242.
(Continued)

*Primary Examiner* — Daniel Pihulic
(74) *Attorney, Agent, or Firm* — Paratus Law Group, PLLC

(57) ABSTRACT

An echo measuring apparatus has: a transmission signal forming unit for forming a transmission signal by a pseudo noise sequence signal; a transmitting unit for transmitting the transmission signal as an ultrasonic wave into the water; a receiving unit for receiving an echo of the ultrasonic wave; and a correlator for discriminating the echo corresponding to the transmission signal by executing a correlating process to the echo by the pseudo noise sequence signal and measuring a distance to a measurement target on the basis of a time (Continued)

difference between the transmission signal and the echo, wherein assuming that a velocity of a sound wave in the water is equal to Vu and the distance to the measurement target is equal to D, a period of the transmission signal includes a case where it is equal to or less than (2D/Vu).

17 Claims, 34 Drawing Sheets

(51) Int. Cl.
    *G01S 15/89*     (2006.01)
    *G01S 7/527*     (2006.01)

(56) References Cited

U.S. PATENT DOCUMENTS

| | | | |
|---|---|---|---|
| 2012/0055250 A1 | 3/2012 | Hashimoto et al. | |
| 2017/0371070 A1* | 12/2017 | Teyssandier | G01V 13/00 |
| 2018/0217243 A1* | 8/2018 | Sasakura | G01S 15/89 |
| 2019/0018124 A1* | 1/2019 | Sasakura | G01S 7/524 |

FOREIGN PATENT DOCUMENTS

| | | | | |
|---|---|---|---|---|
| JP | H02-115782 A | 4/1990 | | |
| JP | H06-347539 A | 12/1994 | | |
| JP | H07-218254 A | 8/1995 | | |
| JP | 2000-111647 A | 4/2000 | | |
| JP | 2002-090456 A | 3/2002 | | |
| JP | 2002-131427 A | 5/2002 | | |
| JP | 2004-117129 A | 4/2004 | | |
| JP | 2013-104811 A | 5/2013 | | |
| WO | WO 2011/102130 A1 | 8/2011 | | |
| WO | WO-2017158659 A1 * | 9/2017 | | G01S 15/104 |
| WO | WO-2018173148 A1 * | 9/2018 | | G01S 15/104 |

OTHER PUBLICATIONS

Dec. 13, 2016, International Search Opinion issued for related international application No. PCT/JP2016/004242.

* cited by examiner

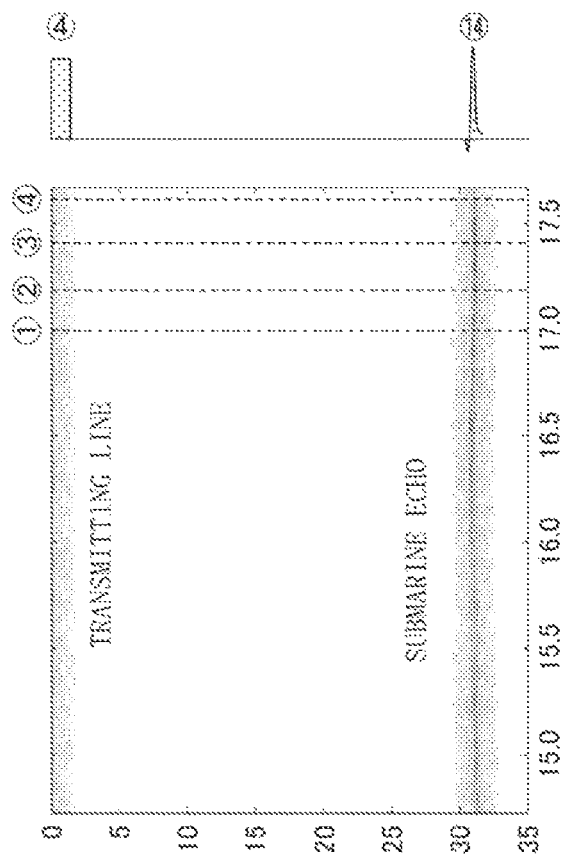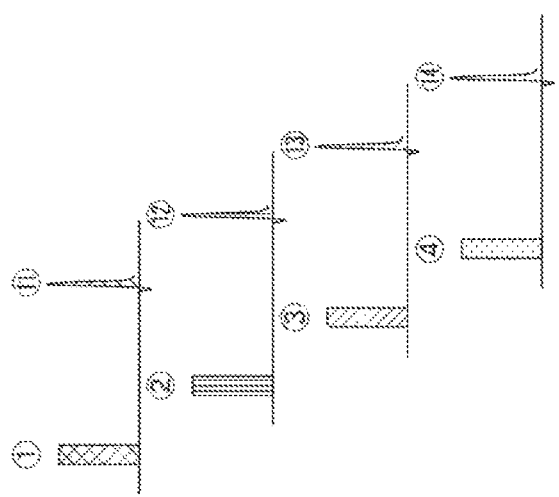
FIG. 10

A
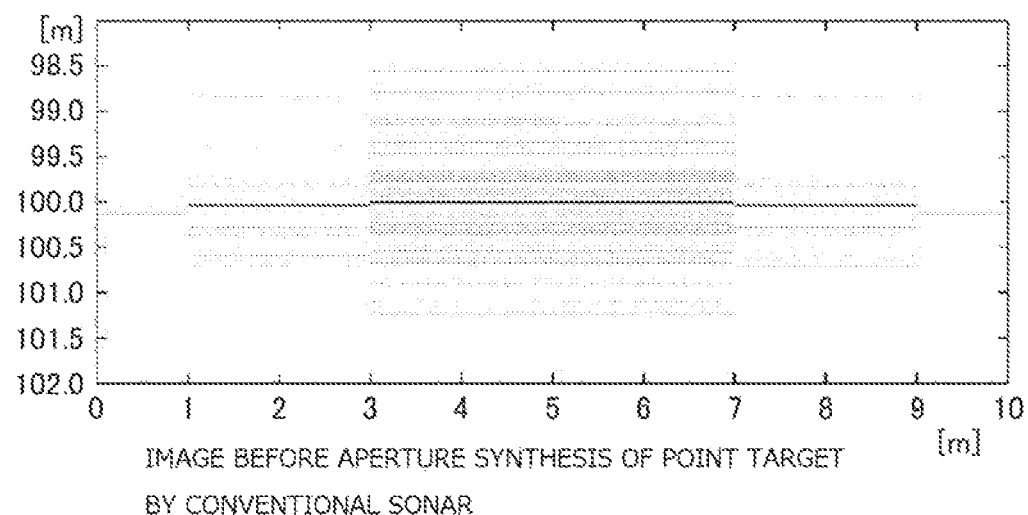
IMAGE BEFORE APERTURE SYNTHESIS OF POINT TARGET
BY CONVENTIONAL SONAR
B
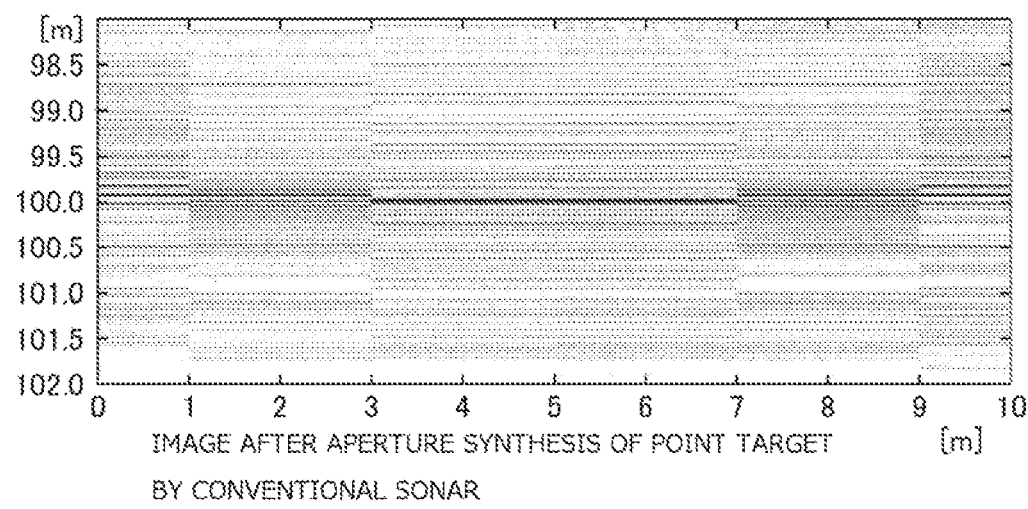
IMAGE AFTER APERTURE SYNTHESIS OF POINT TARGET
BY CONVENTIONAL SONAR
FIG. 27

| t [sec] | DEPTH [m] |
|---|---|
| 0.00 | 5.00 |
| 0.05 | 4.75 |
| 0.10 | 4.54 |
| 0.15 | 4.38 |
| 0.20 | 4.30 |
| 0.25 | 4.31 |
| 0.30 | 4.42 |
| 0.35 | 4.62 |
| 0.40 | 4.89 |
| 0.45 | 5.23 |
| 0.50 | 5.59 |
| 0.55 | 5.95 |
| 0.60 | 6.27 |
| 0.65 | 6.54 |
| 0.70 | 6.72 |
| 0.75 | 6.81 |
| 0.80 | 6.80 |
| 0.85 | 6.69 |
| 0.90 | 6.49 |
| 0.95 | 6.24 |
| 1.00 | 5.95 |
| 1.05 | 5.66 |
| 1.10 | 5.39 |
| 1.15 | 5.18 |
| 1.20 | 5.05 |

FIG. 38

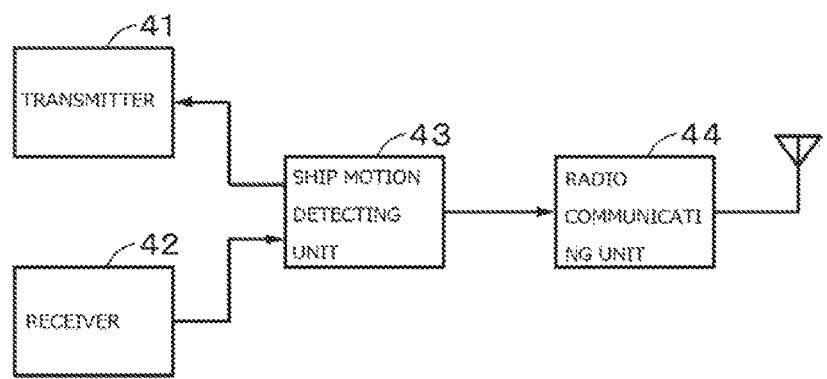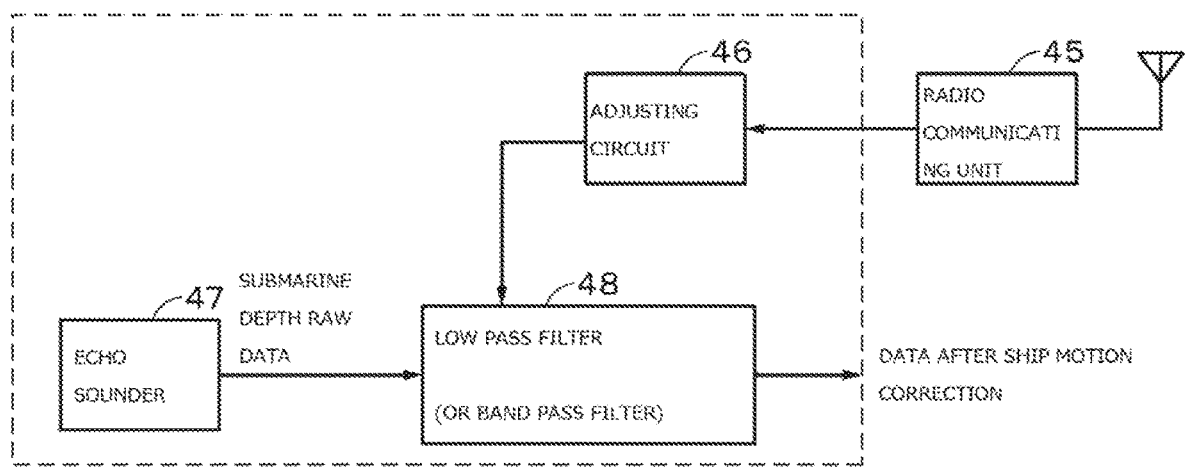
FIG. 40

ECHO MEASURING APPARATUS, ECHO SOUNDING APPARATUS, MULTIBEAM ECHO MEASURING APPARATUS, MULTIBEAM ECHO SOUNDING APPARATUS AND APERTURE SYNTHETIC SONAR

CROSS REFERENCE TO PRIOR APPLICATION

This application is a National Stage Patent Application of PCT International Patent Application No. PCT/JP2016/004242 (filed on Sep. 16, 2016) under 35 U.S.C. § 371, which claims priority to Japanese Patent Application Nos. 2016-050441 (filed on Mar. 15, 2016) and 2016-138095 (filed on Jul. 13, 2016), which are all hereby incorporated by reference in their entirety.

TECHNICAL FIELD

The present invention relates to an echo measuring apparatus, an echo sounding apparatus, a multibeam echo measuring apparatus, a multibeam echo sounding apparatus and an aperture synthetic sonar for measuring a distance, for example, a depth by using an ultrasonic wave which propagates in the water.

BACKGROUND ART

An echo sounding technique in the ocean has been used for long. As shown in FIG. 1, an ultrasonic pulse is generated from an ultrasonic transducer, an echo obtained when its sound wave is reflected from a target (sea bottom) is captured, and its depth is measured by using a propagation speed (about 1500 m/sec) of the sound wave in the water. An echo sounding apparatus using such a principle has been realized as a product 50 or more years ago. Even nowadays, a depth of sea bottom is measured by using such a principle. Such a technique called "echo location" has continuously been used without being changed, in other words, without being developed.

Such a principle is as follows. An ultrasonic pulse (for example, a pulse width of 1 msec) is generated. In the case of the sea bottom of 500 m, now assuming that an underwater velocity Vu of the sound wave is equal to 1500 m/sec, the sound wave is returned after (1000/Vu=1000/1500=0.667 second). Therefore, after its echo was received, an ultrasonic pulse is again generated and a sea bottom at a location which differs by a distance where a ship progressed simultaneously is measured. Such an apparatus that a depth of the sea bottom is sequentially measured in association with the navigation of the ship as mentioned above and measured depths are recorded onto recording paper or displayed as images onto a liquid crystal display screen is called "echo sounding apparatus" (for example, refer to Patent Literature (PTL) 1).

According to the echo sounding apparatus so far, a transmitting interval is controlled so as not to transmit the next pulse before a reception echo is received in consideration of an underwater sound velocity of the ultrasonic wave, and the sounding is performed. As shown in FIG. 2, a sounding apparatus equipped with only one beam is called a single beam sounding apparatus and a sounding apparatus which has been proposed in recent years and in which a plurality of beams are spread in a fan shape as called a multibeam sounding apparatus (for example, refer to PTL 2). The multibeam sounding apparatus can measure depths in a wide range in a lump.

It is now assumed that a depth is equal to D and a transmitting interval of the transmission pulse is equal to T. When (2D/1500)<T, as shown in FIG. 3A, a time difference between the transmission pulse and the reception echo corresponds to (2D/1500). The depth can be measured from the time difference. However, when (2D/1500)≥T, as shown in FIG. 3B, the reception echo arrives after the next transmission pulse was transmitted. Therefore, to which one of the transmission pulses the reception echo corresponds cannot be known. A wrong depth is measured on the basis of such a time difference FD. It is, therefore, a condition of (2D/1500)<T is necessary hitherto.

Such a point that the transmitting period cannot be shortened results in that a resolution in the horizontal direction of the sounding cannot be decreased. A resolution of a measurement in the progressing direction (horizontal direction) of a ship will be described with reference to FIG. 4. A resolution ΔH (m) in the horizontal direction in the case of performing the sounding of a depth D (m) at a ship velocity V (m/sec) is obtained by the following equation.

$$\Delta H = VT > 2DV/1500$$

For example, if the ship sails at 10 kt (speed per hour: 10×1.852 km) and the transmitting period is equal to 1 second, sounding data can be obtained only every about 5 m. To measure a sea bottom of a depth of 1000 m, it can be measured only when the transmitting period T is set to ((1000×2)/1500=1.33 seconds) or more. However, if the ship sails at 10 kt, the ship progresses by 6.7 m after 1.33 seconds. Therefore, the resolution ΔH of the measurement is equal to 6.67 m. Although the multibeam sounding apparatus can measure depths in a wide range in a lump, the resolution of the measurement in the progressing direction of the ship is similar to that in the case of the single beam.

In the conventional echo sounding apparatus, in order to raise the resolution of the measurement, there is only a method of reducing the velocity of the ship. Therefore, the conventional echo sounding apparatus has such a problem that in the case of raising the resolution in the horizontal direction of the sounding, a time required for the sounding becomes long.

Further, as shown in FIG. 5, in the case of measuring a sea bottom by a sound wave, a depth which is measured becomes deeper or shallower than the true sea bottom because a reference sea level is subjected to a ship motion of waves. The bottom depth which is obtained by the measurement is as shown in FIG. 6 and a distance to the true bottom cannot be measured. In order to solve such a problem, it is necessary to detect a component of the ship motion and correct the ship motion.

As mentioned above, in the conventional echo sounder, the transmitting period cannot be shortened and since the transmitting period is longer or almost equal to a period of the ship motion due to the waves, it is difficult that the ship motion due to an influence by the waves is detected and corrected. From a sampling theory, unless the ship motion is sampled at a frequency which is two or more times as high as a maximum value of a frequency component of the ship motion, it is impossible to detect the ship motion component. Therefore, in the case of correcting the ship motion, hitherto, as disclosed in PTL 3, generally, a displacement amount is detected from triaxial accelerations and the ship motion is corrected based on a detection result.

CITATION LIST

Patent Literature

[PTL 1] JP 2001-083247 A
[PTL 2] JP 2006-220436 A
[PTL 3] JP 2010-025739 A

SUMMARY OF INVENTION

Technical Problem

An acceleration sensor is used to detect a displacement amount of a ship motion. A velocity is obtained by integrating an acceleration once and by further integrating the velocity, the displacement amount is obtained. According to such a ship motion detection using the acceleration sensor, there is such a problem that an error occurs and it is necessary to correct the error. Further, there is such a problem that the acceleration sensor is necessary and an increase in costs is caused.

It is, therefore, an object of the invention to provide an echo measuring apparatus, an echo sounding apparatus, a multibeam echo measuring apparatus, a multibeam echo sounding apparatus and an aperture synthetic sonar which can eliminate a restriction of a transmitting period, realize a short transmitting period, and raise a resolution.

It is another object of the invention to provide an echo measuring apparatus, an echo sounding apparatus, a multibeam echo measuring apparatus, a multibeam echo sounding apparatus, and an aperture synthetic sonar which can correct a ship motion by using a reception signal without using any acceleration sensor.

The first invention of the invention is an echo measuring apparatus which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit; and a correlator configured to discriminate the echo corresponding to the transmission signal by executing a correlating process to the echo by the pseudo noise sequence signal and measure a distance to a measurement target on the basis of a time difference between the transmission signal and the echo, wherein in the case where a velocity of a sound wave in the water is equal to Vu and the depth to the bottom is equal to D, a period of the transmission signal includes a case where it is equal to or less than (2D/Vu).

The second invention of the invention is a multibeam echo measuring apparatus which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal by modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit; and a correlator configured to discriminate the echo corresponding to the transmission signal by executing a correlating process to the echo by the pseudo noise sequence signal and measure a distance to a measurement target on the basis of a time difference between the transmission signal and the echo, wherein in the case where a velocity of a sound wave in the water is equal to Vu and the depth to the bottom is equal to D, a period of the transmission signal includes a case where it is equal to or less than (2D/Vu), and a number of ultrasonic beams are transmitted in a fan shape by the transmitting unit.

The third invention of the invention is an aperture synthetic sonar which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal by modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit; and a correlator configured to discriminate the echo corresponding to the transmission signal by executing a correlating process to the echo by the pseudo noise sequence signal and measure a distance to a measurement target on the basis of a time difference between the transmission signal and the echo, wherein in the case where a velocity of a sound wave in the water is equal to Vu and the depth to the bottom is equal to D, a period of the transmission signal includes a case where it is equal to or less than (2D/Vu), and a directivity which is equivalent to that of a transducer of a long aperture is formed by moving a transmitter and a receiver of one set.

The fourth invention of the invention is an echo sounding apparatus which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal by modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit;

a correlator configured to discriminate the echo corresponding to the transmission signal by executing a correlating process to the echo by the pseudo noise sequence signal and obtain depth raw data on the basis of a time difference between the transmission signal and the echo; and a ship motion correcting unit configured to suppress a ship motion component by executing a ship motion correction to the depth raw data, wherein in the case where a velocity of a sound wave in the water is equal to Vu and a depth to the bottom is equal to D, a period of the transmission signal is equal to or less than (2D/Vu) and satisfies a sampling theory as compared with a period of the ship motion component.

The fifth invention of the invention is a multibeam echo sounding apparatus which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal by modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit;

a correlator configured to discriminate the echo corresponding to the transmission signal by executing a correlating process to the echo by the pseudo noise sequence signal and obtain depth raw data on the basis of a time difference between the transmission signal and the echo; and a ship motion correcting unit configured to suppress a ship motion component by executing a ship motion correction to the depth raw data, wherein in the case where a velocity of a sound wave in the water is equal to Vu and a depth to the bottom is equal to D, a period of the transmission signal is equal to or less than (2D/Vu) and satisfies a sampling theory as compared with a period of the ship motion component, and a number of ultrasonic beams are transmitted in a fan shape by the transmitting unit.

The sixth invention of the invention is an aperture synthetic sonar which is attached to a moving object such as a ship or the like and detects a measurement target in the water, comprising:

a transmission signal forming unit having a pseudo noise sequence generating circuit for generating a pseudo noise sequence signal and a modulating circuit for forming a transmission signal by modulating a carrier signal by the pseudo noise sequence signal of transmission timing;

a transmitting unit configured to transmit sequentially the transmission signal as an ultrasonic wave toward the bottom of the lower portion of the moving object;

a receiving unit configured to receive an echo due to the reflection at the bottom with the ultrasonic wave transmitted from the transmission signal forming unit;

a correlator configured to discriminate the echo corresponding to the transmission signal by executing a correlating process to the echo by the pseudo noise sequence signal and obtain depth raw data on the basis of a time difference between the transmission signal and the echo; and a ship motion correcting unit configured to suppress a ship motion component by executing a ship motion correction to the depth raw data, wherein in the case where a velocity of a sound wave in the water is equal to Vu and a depth to the bottom is equal to D, a period of the transmission signal is equal to or less than (2D/Vu) and satisfies a sampling theory as compared with a period of the ship motion component, and a directivity which is equivalent to that of a transducer of a long aperture is formed by moving a transmitter and a receiver of one set.

According to the invention, since the transmitting period can be shortened, a resolution in the horizontal direction can be raised. In the invention, since the transmitting period is short, there is a correlation between front and rear receiving echo signals. Therefore, since an S/N ratio can be improved by performing an addition of the front and rear receiving echo signals or the like, even in the case of a low transmission output, the receiving echo signals can be added and a miniaturization and a design for saving electric power consumption of the apparatus can be accomplished.

Further, according to the invention, since the resolution in the horizontal direction can be raised, for example, the ship motion component by the waves can be accurately detected and the ship motion correction can be performed by using the detected ship motion component. Since the acceleration sensor is not used, an increase in costs can be prevented and an influence of an error can be reduced. The effects disclosed here are not always limited but may be any effect disclosed in the Description.

BRIEF DESCRIPTION OF DRAWINGS

FIG. 10 Schematic diagram for use in description of a case of displaying reception signals.

FIG. 27 Schematic diagram showing an image before the aperture synthesis and an image after the aperture synthesis of an example of a point target in the related art.

FIG. 38 Block diagram for describing specific examples of the ship motion correction in the third embodiment of the invention.

FIG. 40 Block diagram for describing the fourth embodiment of the invention.

DESCRIPTION OF EMBODIMENTS

Embodiments of the invention will be described hereinbelow. The embodiments which will be described hereinbelow are exemplary specific examples of the invention and various kinds of limitations which are technically preferred are added. However, it is assumed that the scope of the invention is not limited to those embodiments unless otherwise described to limit the invention in the following explanation.

The invention will be described in accordance with the following order.
<1. First embodiment>
<2. Aperture synthesis>
<3. Second embodiment>
<4. Third embodiment>
<5. Fourth embodiment>
<6. Application>
<7. Modification>

1. First Embodiment

Figure 7:
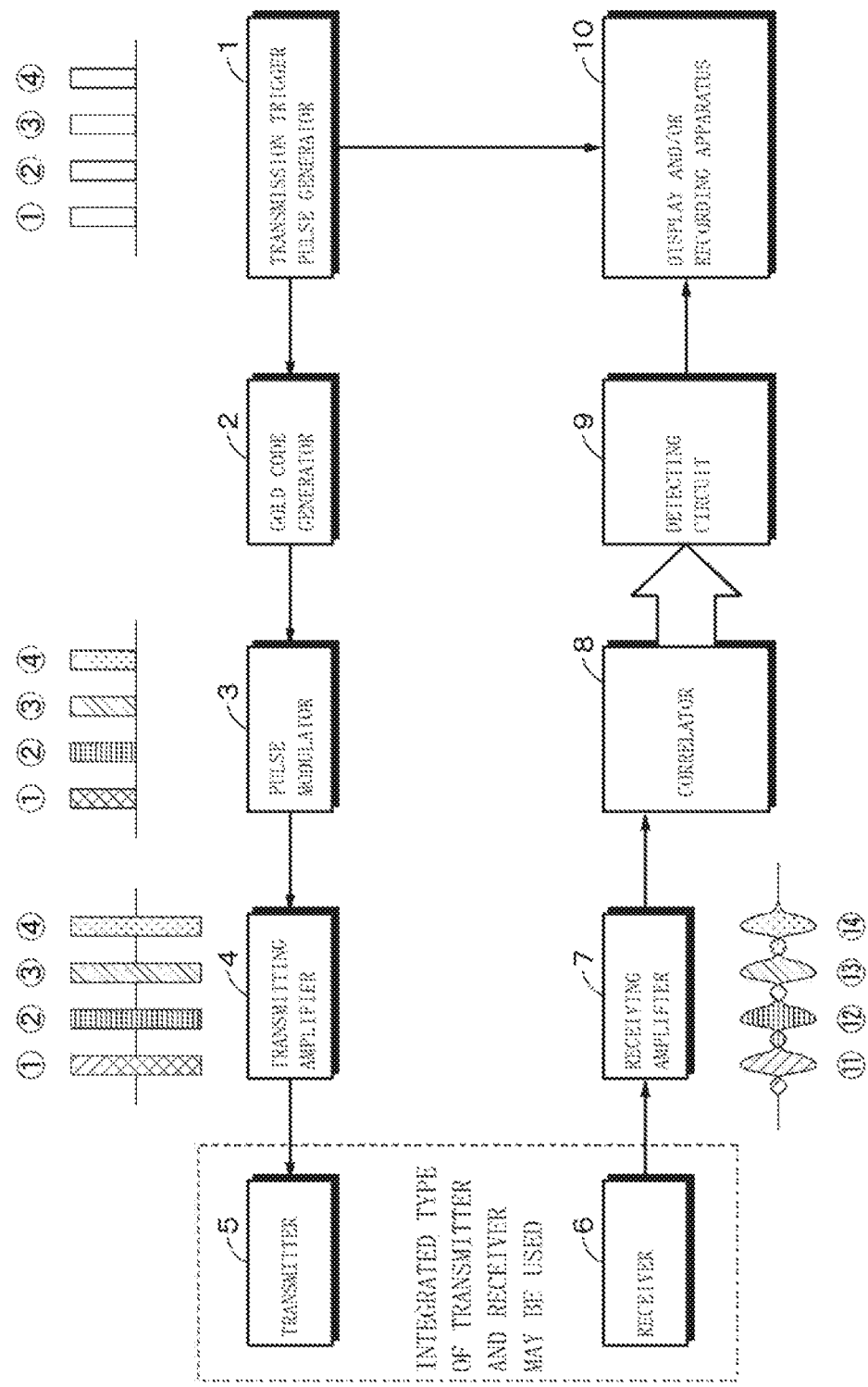
FIG. 7 Block diagram showing a construction of the first embodiment of the invention.

FIG. 7 shows an electrical construction of the first embodiment of the invention. A transmission trigger pulse generator 1 for generating a transmission trigger pulse of a pulse signal of a predetermined period is provided. The transmission trigger pulse is supplied to a gold code generator 2 as a PN sequence generator and a display or recording apparatus 10. The display and/or recording apparatus 10 includes: a display apparatus such as a liquid crystal or the like and/or a recording apparatus such as a semiconductor memory or the like; and an arithmetic operating apparatus for displaying or recording.

The gold code generator 2 generates a gold code synchronously with the transmission trigger pulse. A PN (Pseudo random Noise) sequence such as an M sequence or the like other than the gold code may be used. The gold code is supplied to a pulse modulator 3. The gold code is digital-modulated by, for example, a BPSK (Binary Phase Shift Keying). A frequency of a carrier is set to a few kHz to hundreds of kHz.

An output signal of the pulse modulator 3 is supplied to a transmitting amplifier 4. A process such as an amplification or the like is executed in the transmitting amplifier 4. An output signal of the transmitting amplifier 4 is supplied to a transmitter 5. An ultrasonic wave is transmitted into the water from the transmitter 5. An echo of the emitted underwater ultrasonic wave is received by a receiver 6. An integrated construction may be used as a transmitter 5 and a receiver 6.

Reception data from the receiver 6 is supplied to a receiving amplifier 7, is subjected to a process such as an amplification or the like, and thereafter, is supplied to a correlator 8. An output of the correlator 8 is supplied to a detecting circuit 9. A reception echo corresponding to the transmission pulse is extracted by the correlator 8. The detecting circuit 9 executes an arithmetic operation (for example, A/D conversion) for displaying. An output of the detecting circuit 9 is supplied to the display and/or recording apparatus 10. A time which is required until the echo is received in response to the transmission pulse is displayed and/or recorded, respectively.

Figure 8:
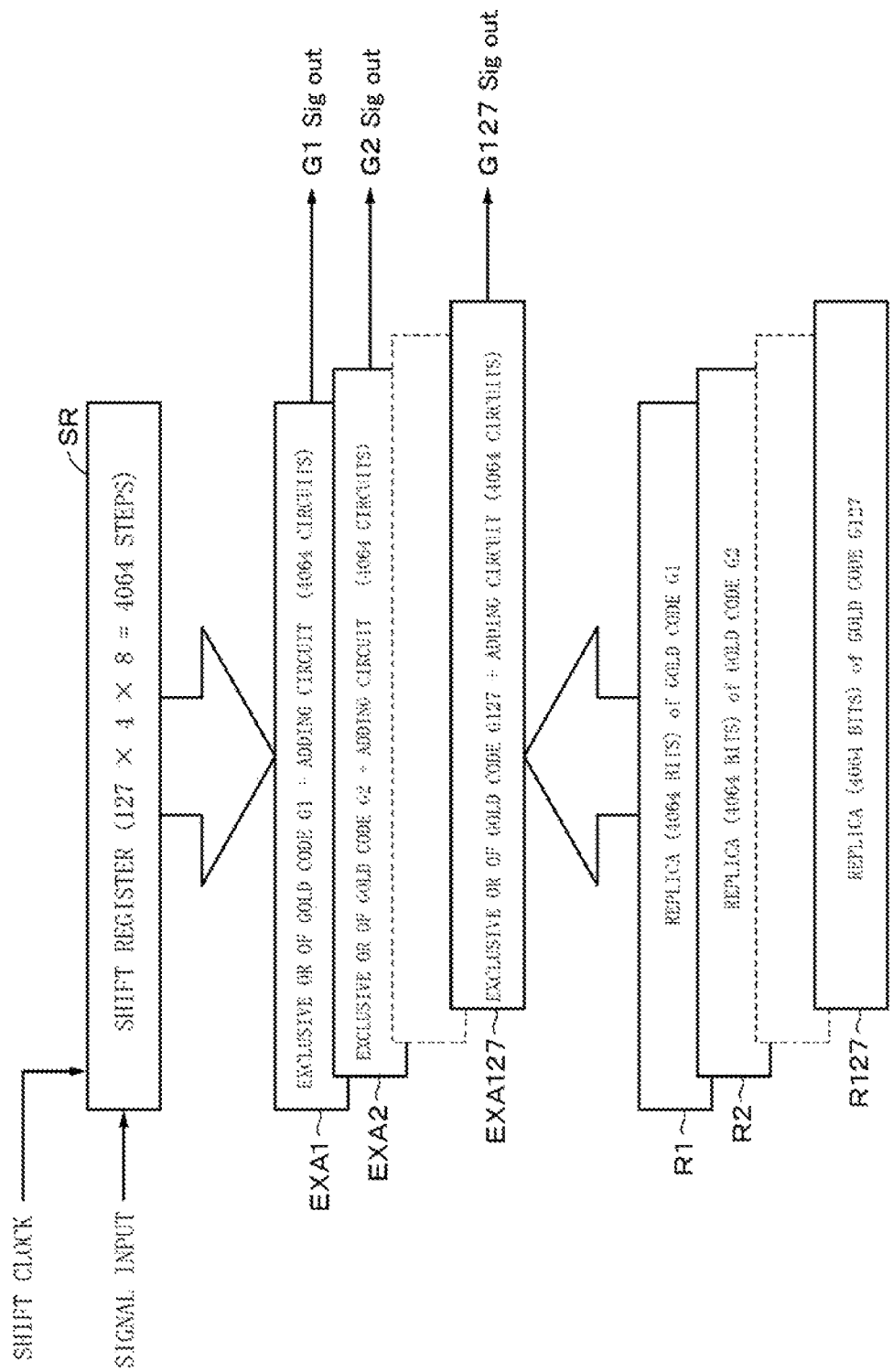
FIG. 8 Block diagram for use in description of a correlator in the first embodiment of the invention.

FIG. 8 shows a correlation detecting process. The receiving echo signal is serially input to a shift register SR of 4064 steps. It is desirable to improve an S/N ratio by performing an addition of a plurality of front and rear receiving echo signals or the like to the shift register SR. Noises can be reduced by the adding process, a low transmission output can be realized, and a miniaturization and a design for saving electric power consumption of the apparatus can be accomplished. It is assumed that a shift clock for making the shift register SR operative is set to (20×8=1600 kHz=1.6 MHz). Such a frequency is shown as an example and a shift clock of a frequency which is two or more times as high as a carrier frequency (20 kHz) can be used. The receiving echo signal is supplied to the shift register SR, so that it is sampled at a frequency which is eight times as high as that of a carrier signal.

Arithmetic operating circuits $EXA_1$ to $EXA_{127}$ are provided for the shift register SR in parallel. Each of the arithmetic operating circuits $EXA_1$ to $EXA_{127}$ is constructed by an exclusive OR circuit and adding circuits (4064 circuits). 4064 bits of the shift register SR are supplied in common to the exclusive OR circuit of each of the arithmetic operating circuits $EXA_1$ to $EXA_{127}$.

Figure 9:
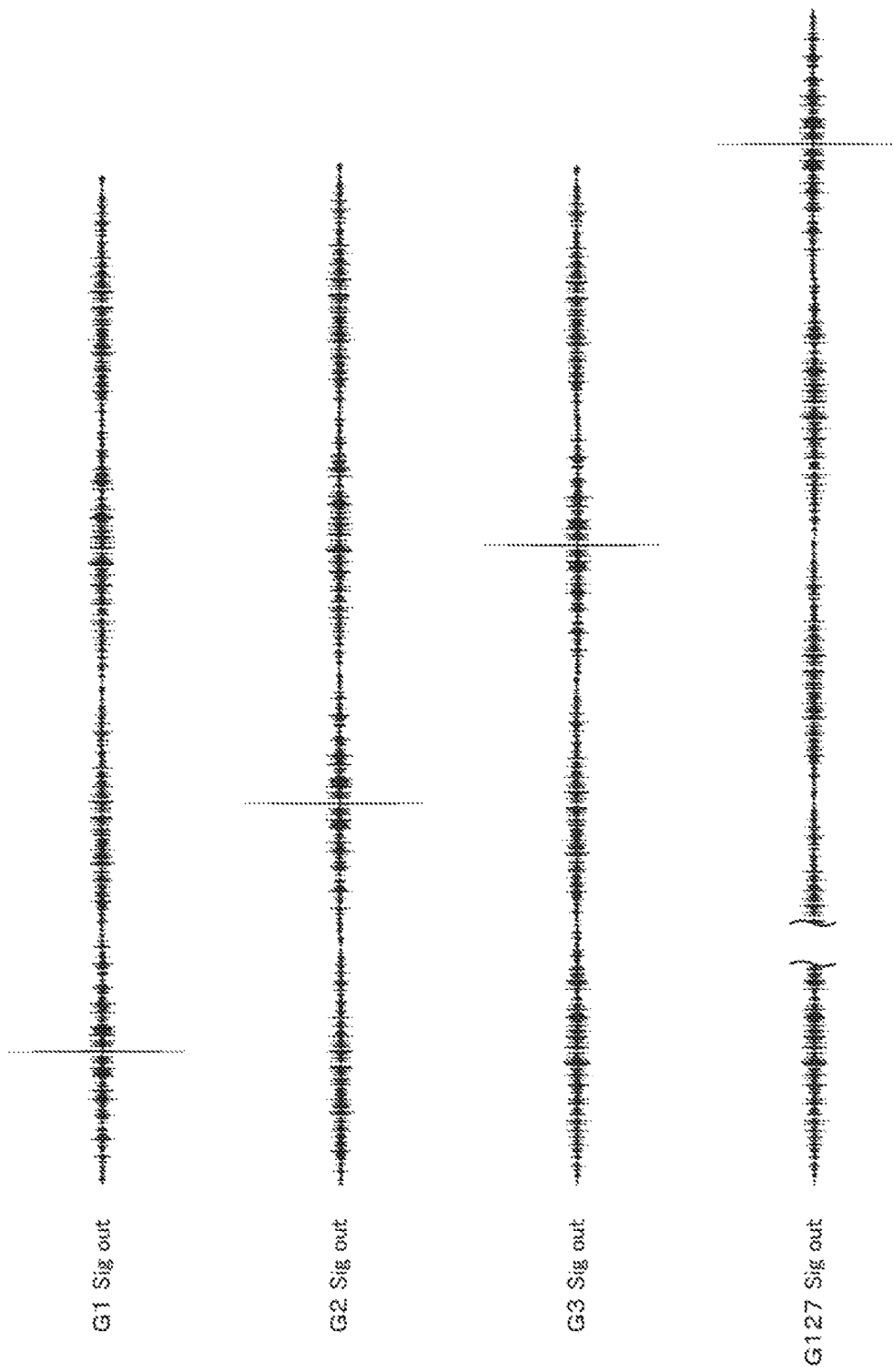
FIG. 9 Waveform diagram for use in description of an output of the correlator.

A replica (replica of 4064 bits) of a code $G_1$ of the gold code, a replica of a code $G_2, \ldots,$ and a replica of a code $G_{127}$ are supplied to the exclusive OR circuits of the respective arithmetic operating circuits $EXA_1$ to $EXA_{127}$. If bits of two inputs have the same value, an output of the exclusive OR circuit is equal to "0", and if the bits of the two inputs have different value, the output is equal to "1". The outputs of 4064 bits of the respective exclusive OR circuits are added. As for the addition, if the number of "1" is equal to N, a signal of an amplitude of a value of N is output. By getting a negative OR, the larger a degree of coincidence of the two inputs is, the output of a large value is obtained. The addition values of the arithmetic operating circuits $EXA_1$ to $EXA_{127}$ are as shown in FIG. 9. The output of a large amplitude indicates the receiving echo signal which coincides with the gold code of the transmission pulse.

FIG. 10 is a diagram for describing the case where the display is performed in the display and/or recording apparatus 10. The transmission trigger pulse is supplied to the display and/or recording apparatus 10. Timing of the transmission trigger pulse is displayed as a transmitting line (0 m) on the upper side of a display screen. A detection signal from the detecting circuit 9 responsive to the transmission trigger pulse is displayed in a state where, for example, it is colored. Since the transmission trigger pulse is a fast cyclic signal in a range from a few Hz to tens of Hz, by displaying the detection signals corresponding to the transmission trigger pulses from a correlator 8 so as to be aligned in order, a sounding image appears at a speed which is a few to tens of times as high as that of the conventional echo sounding apparatus.

Figure 11:
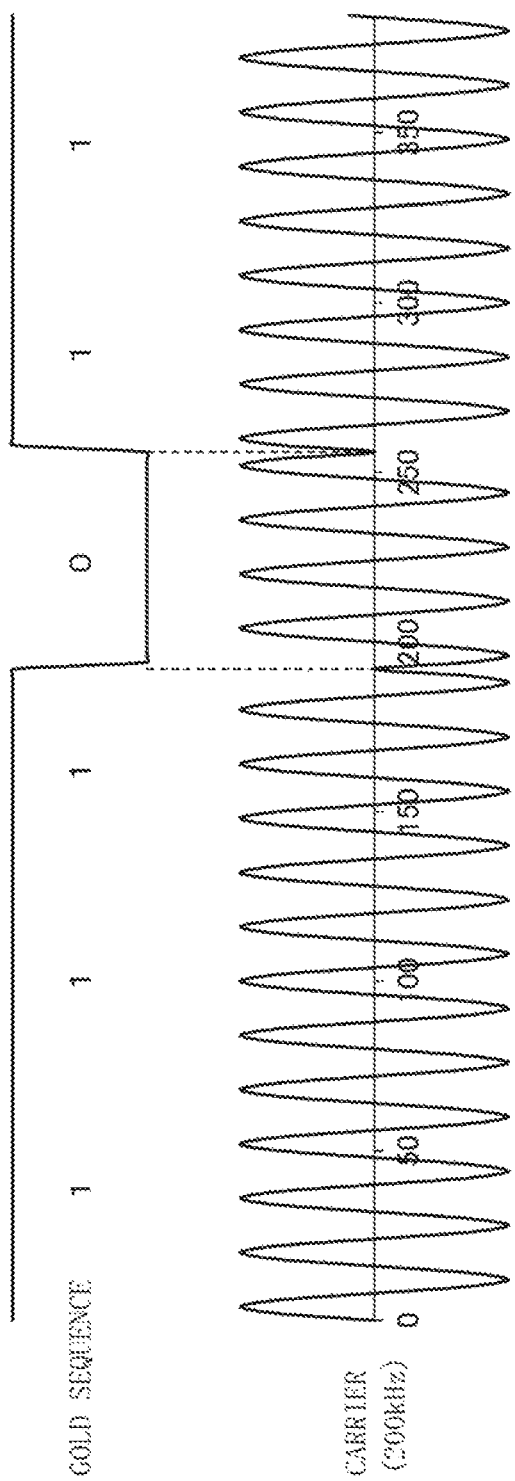
FIG. 11 Waveform diagram showing an example of a modulating method of a transmission signal.

FIG. 11 is a diagram for describing an example of a pulse modulation. For example, a phase is switched to 0 and π in correspondence to "0" and "1" of the bits of the gold code every four periods (4 waves) of a carrier of, for example, 200 kHz. The frequency of the carrier is an example and may be another frequency. A modulation system such as QPSK or the like other than BPSK may be used. Further, the invention is not limited to the phase modulation but an amplitude modulation may be used.

In the correlator 8, a correlation is detected by a digital signal process. One bit is constructed by 4 periods and each period is digitized by eight samples. Therefore, if a code of the gold code is constructed by 127 bits, one receiving echo signal is constructed by (127×4×8=4064 bits).

Figure 12:
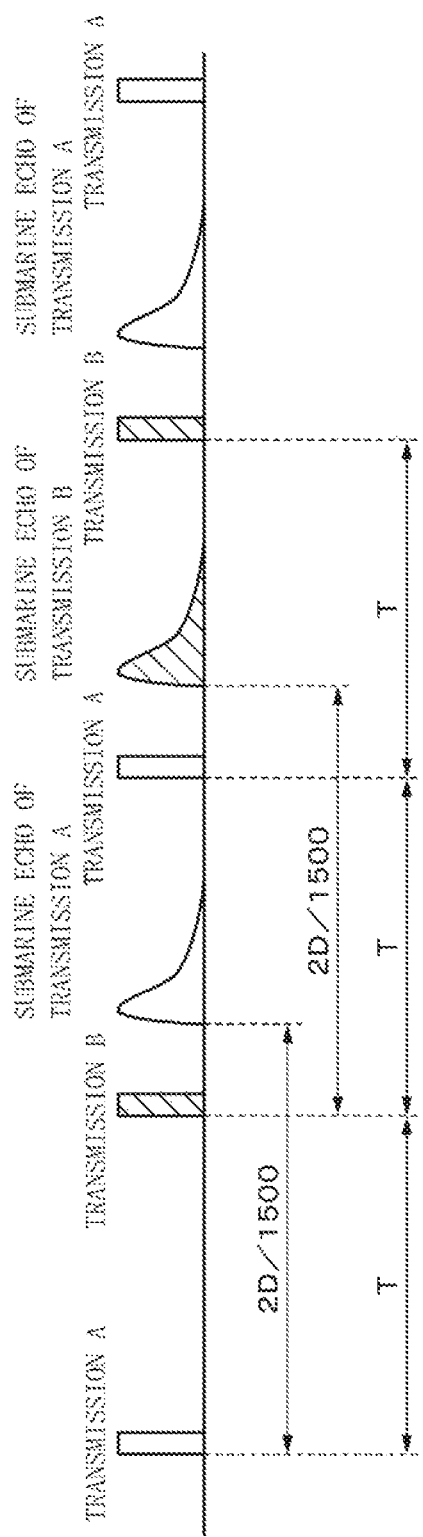
FIG. 12 Waveform diagram for use in description of the first embodiment of the invention.

In the foregoing first embodiment, the transmission signal and the receiving echo signal (submarine echo) can be identified. As shown in FIG. 12, a transmission signal A and a transmission signal B are set to different gold codes. The receiving echo signal corresponding to the transmission signal A is received after the transmission signal B and it can be identified that the receiving echo signal is a signal corresponding to the transmission A. Therefore, a restriction ((2D/1500)<T) regarding a transmitting period T as shown in the related arts can be eliminated.

In the first embodiment, a resolution in the horizontal direction is shown by the following equation.

$$\Delta H = VT$$

Figure 13:
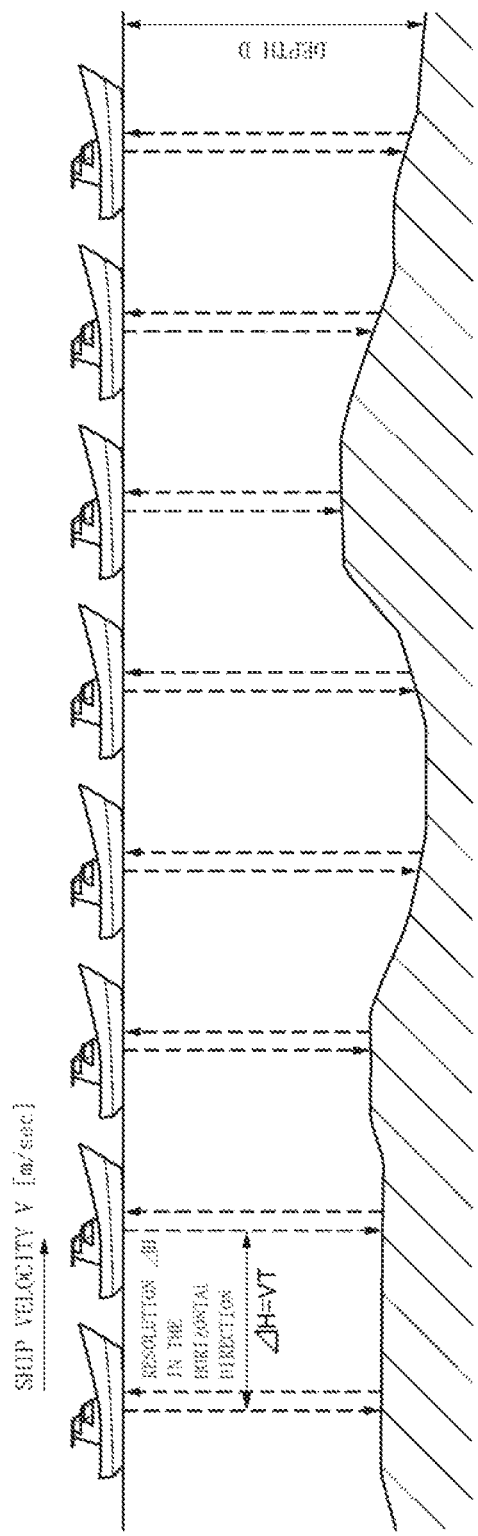
FIG. 13 Schematic diagram for use in description of a resolution in the horizontal direction in the first embodiment of the invention.
Figure 14:
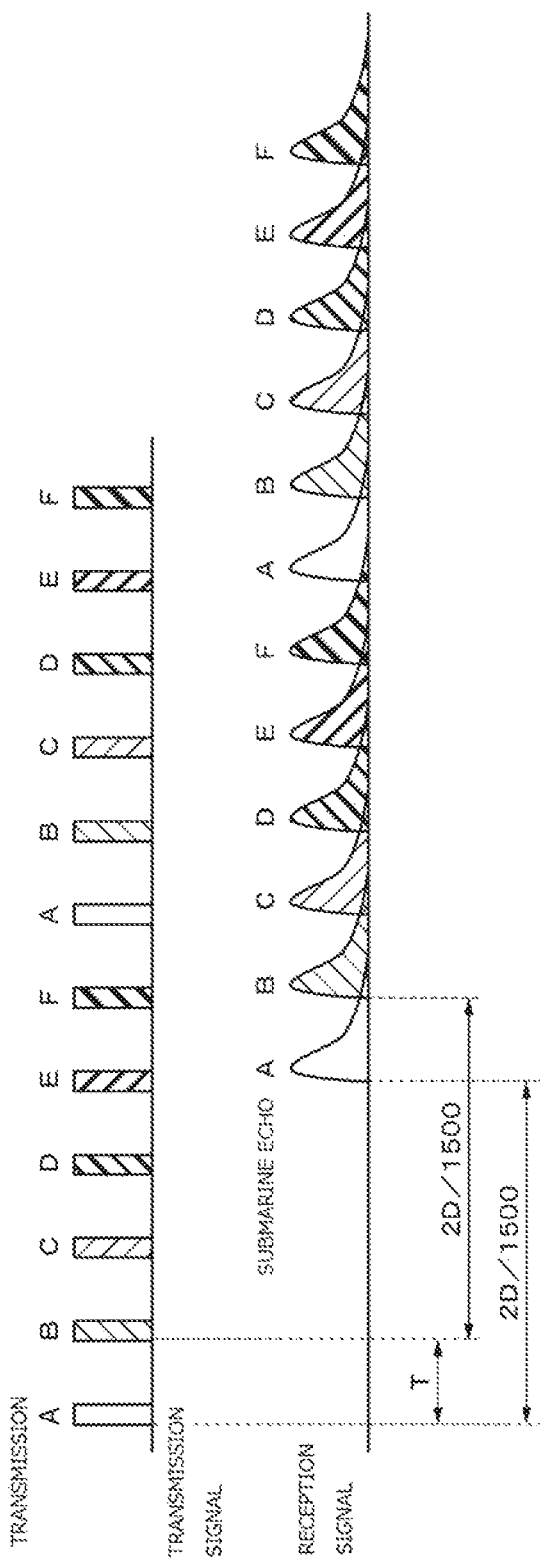
FIG. 14 Waveform diagram for use in description of the first embodiment of the invention.
Figure 15:
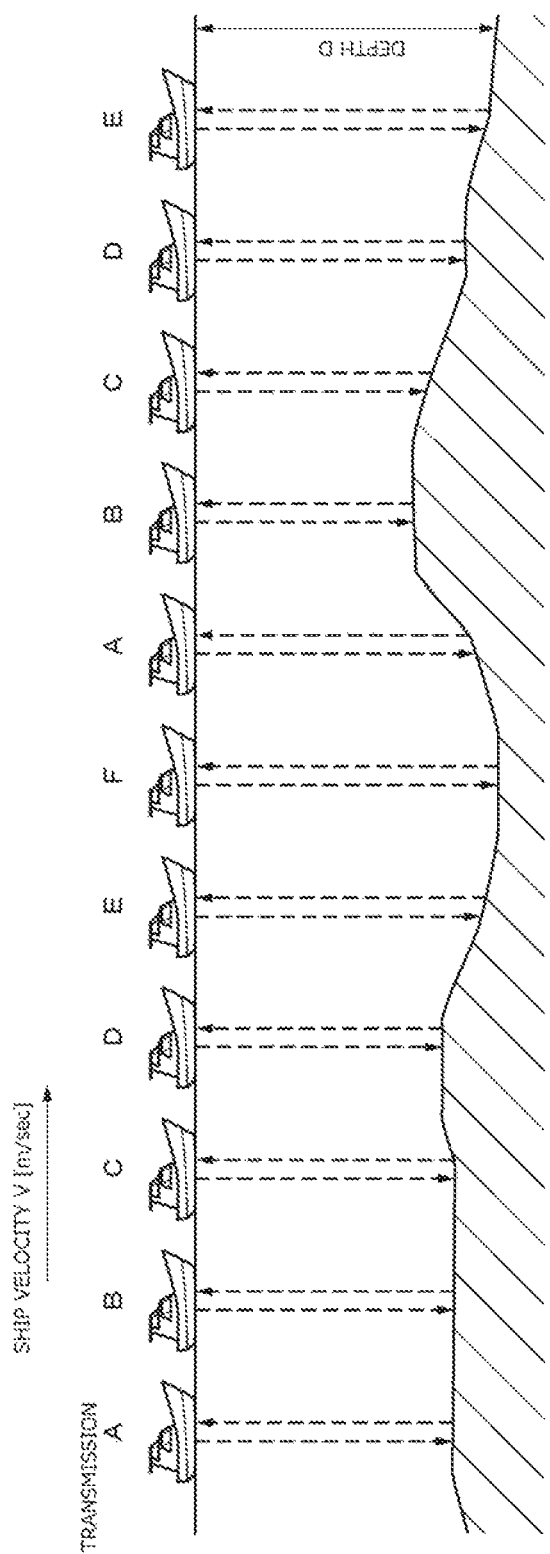
FIG. 15 Schematic diagram for use in description of a resolution in the horizontal direction in the first embodiment of the invention.

For example, in the case where a ship sails at 10 kt (speed per hour: 10×1.852 km) and the transmitting period is equal to 0.1 second, $\Delta H$=0.5 m. The resolution (measuring interval) in the horizontal direction can be determined irrespective of a sounding depth. As shown in FIG. 13, the resolution $\Delta H$ in the horizontal direction is determined only from the transmitting period T and a ship velocity V irrespective of the depth. Further, a case where six kinds of transmission signals can be identified is schematically shown in FIGS. 14 and 15. As mentioned above, the transmitting period T can be set to a short period, the sounding can be performed irrespective of the depth, and the high horizontal measuring resolution can be obtained.

Although the transmission signals can be also identified by the frequency or the like, according to a frequency discriminating system, if a frequency range which is used is widened, since a propagation loss in the water differs depending on the frequency, a frequency difference occurs in the detected distances or the like and it is, therefore, undesirable. In the first embodiment, since the transmission signals are identified by one frequency, such a problem does not occur. In other words, since the transmission signals can be identified, such a restriction of the transmitting period that after the echo of the sea bottom was returned, the next transmission signal is emitted as in the related arts is eliminated. The sounding can be performed at the short transmitting period. The resolution in the horizontal direction can be remarkably improved.

Figure 16:
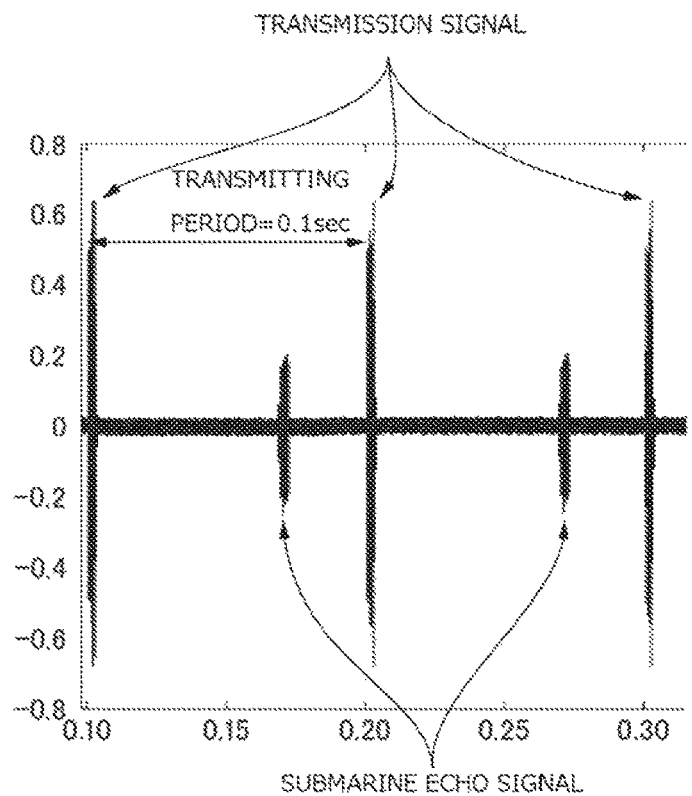
FIG. 16 Schematic diagram for use in description of a result of a simulation of the conventional echo sounding apparatus.
Figure 17:
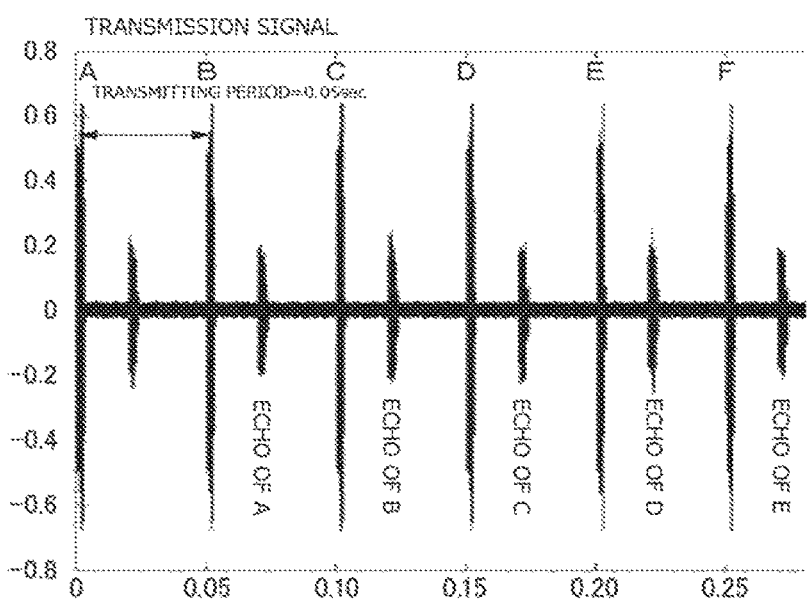
FIG. 17 Schematic diagram for use in description of a result of a simulation of an echo sounding apparatus according to the invention.
Figure 18:
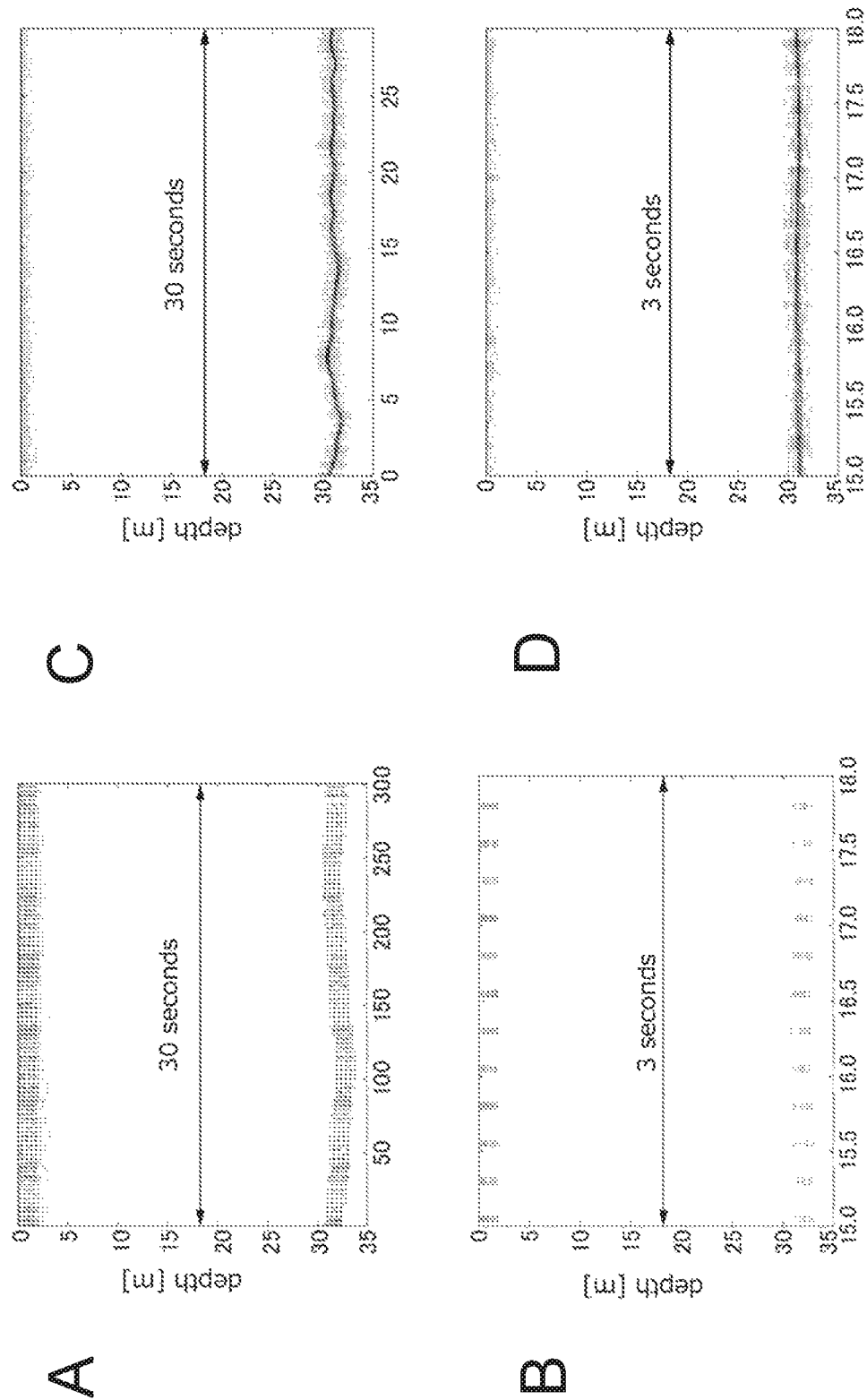
FIG. 18 Schematic diagram showing display images according to the conventional echo sounding apparatus and display images according to the first embodiment for the purpose of comparison.

Results of the simulation and examples of the actual measurement will now be described with reference to FIGS. 16, 17, and 18. FIG. 16 shows transmission signals and receiving echo signals (submarine echoes) which are obtained by the conventional echo sounding apparatus. The transmitting period is equal to 0.1 sec and the submarine echo appears at a point of time about 0.07 sec. As for the transmission signal, after the echo was received, the next transmission is performed. By measuring a time which is required until the echo is received after the transmission was performed, the depth can be known. In this case, assuming that an underwater sound velocity is equal to 1500/sec, the depth of (0.07×1500/2=52.5 m) can be obtained.

On the other hand, in the echo sounding apparatus according to the first embodiment, the transmitting period can be decided irrespective of the depth. In the example of FIG. 17, the transmitting period is equal to 0.05 sec. Although the receiving echo signal of the sea bottom can be obtained between the transmission signals, since code numbers A, B, C, . . . which can be identified have been added to the transmission signals, after passing through the correlator, the reception signal can be identified. Those signals can be identified even at a transmitting period shorter than that in the above example. Even if the transmission signal and the reception signal overlap, they can be identified.

With respect to the actual receiving echo signals, images obtained by the echo sounding apparatus of the conventional system and images obtained by the echo sounding apparatus according to the first embodiment are compared. FIGS. 18A and 18B show the images obtained by the conventional echo sounding apparatus. FIG. 18 is a diagram for comparing the images obtained by the echo sounding apparatus of the conventional system and the images obtained by the echo sounding apparatus according to the first embodiment. FIG. 18A shows the image according to the conventional system in the case where an axis of abscissa is set to 30 seconds. FIG. 18B shows the image in the case where an axis of abscissa is set to 3 seconds. In this example, the image is an image obtained by performing the transmission four times per second, and the axis of abscissa shows the fairly coarse image.

Figure 19:
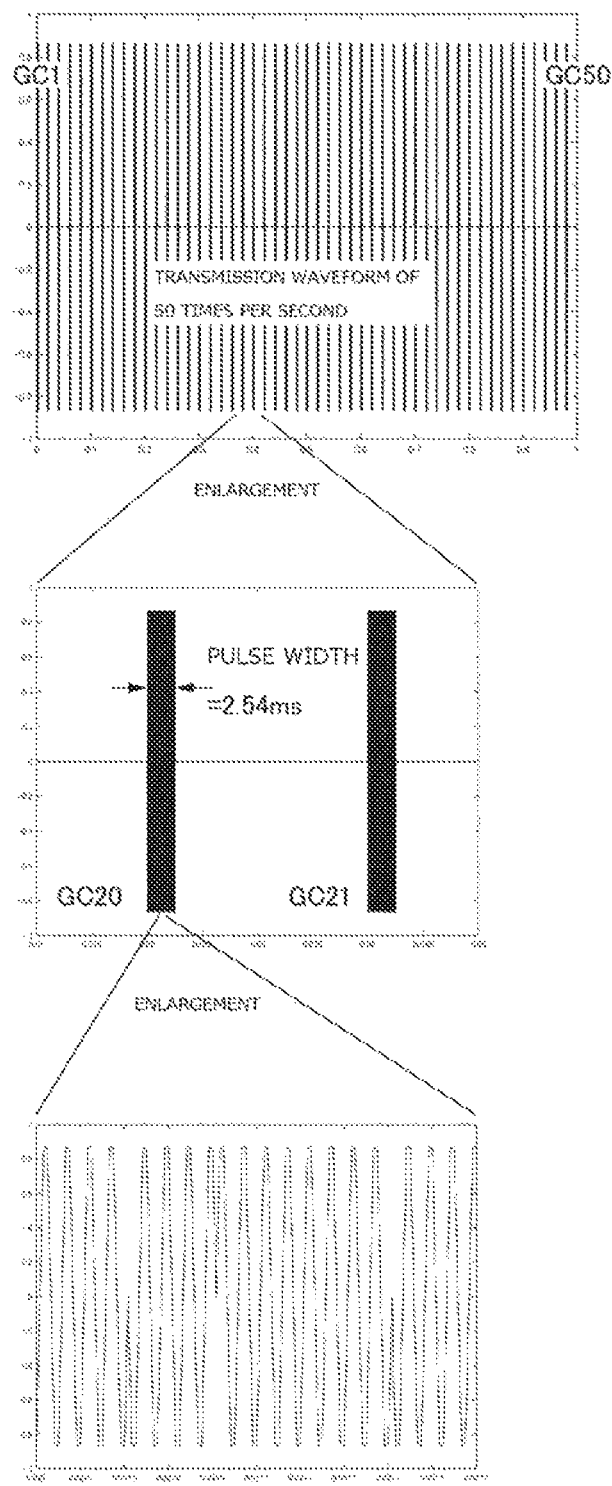
FIG. 19 Waveform diagram of an example of a transmission signal of the echo sounding apparatus according to the invention.

On the other hand, FIG. 18C shows the image obtained in the case where the system of the first embodiment is applied, the transmitting period is set to 0.05 sec, and the transmission is performed 20 times per second. FIG. 18D is a partial enlarged diagram of FIG. 18C. As compared with FIG. 18B, will be understood that the fairly fine resolution in the direction of the axis of abscissa is obtained. Actual transmission signals obtained in the case where the transmitting period is set to 50 times per second are as shown in FIG. 19. A signal of 200 kHz is phase-modulated by the quinary gold code of 127 bits on the assumption that four waves are set to one bit, pulse signals modulated by the different gold codes every 20 msec are arranged, and the transmission is performed.

Assuming that a frequency of the carrier is equal to fc, the number of waves which are used for one bit is equal to N cycles, and a length of gold code is equal to M bits, one pulse width Pd is expressed by the following equation.

$$Pd = (1/fc) \times N \times M$$

When the carrier frequency fc=200 kHz, the number N of waves which are used for one bit is N=4, and the length M of gold code is M=127, the pulse width Pd is as shown below.

$$Pd = 1/200000 \times 4 \times 127 = 0.00254 = 2.54 \text{ msec}$$

Figure 20:
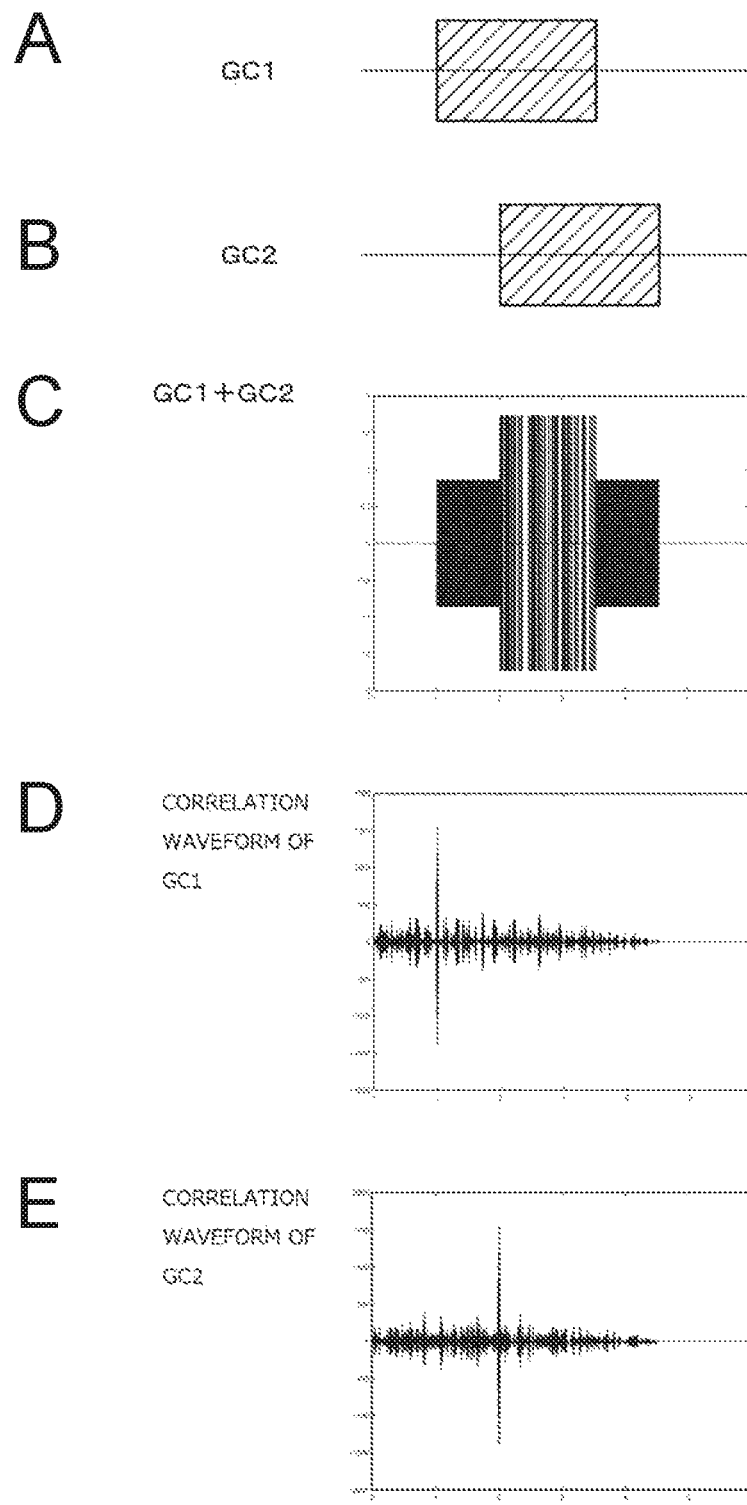
FIG. 20 Waveform diagram for use in description of a case where two gold code signals overlap in the echo sounding apparatus according to the invention.

Even if the transmitting period is further shortened and the two transmission pulses are transmitted so as to overlap, they can be separated after the correlating process. FIG. 20 shows a fact that even if two gold code signals (GC1 and GC2) are transmitted or received so as to overlap, those two gold code signals can be separately detected.

2. Aperture Synthesis

Figure 21:
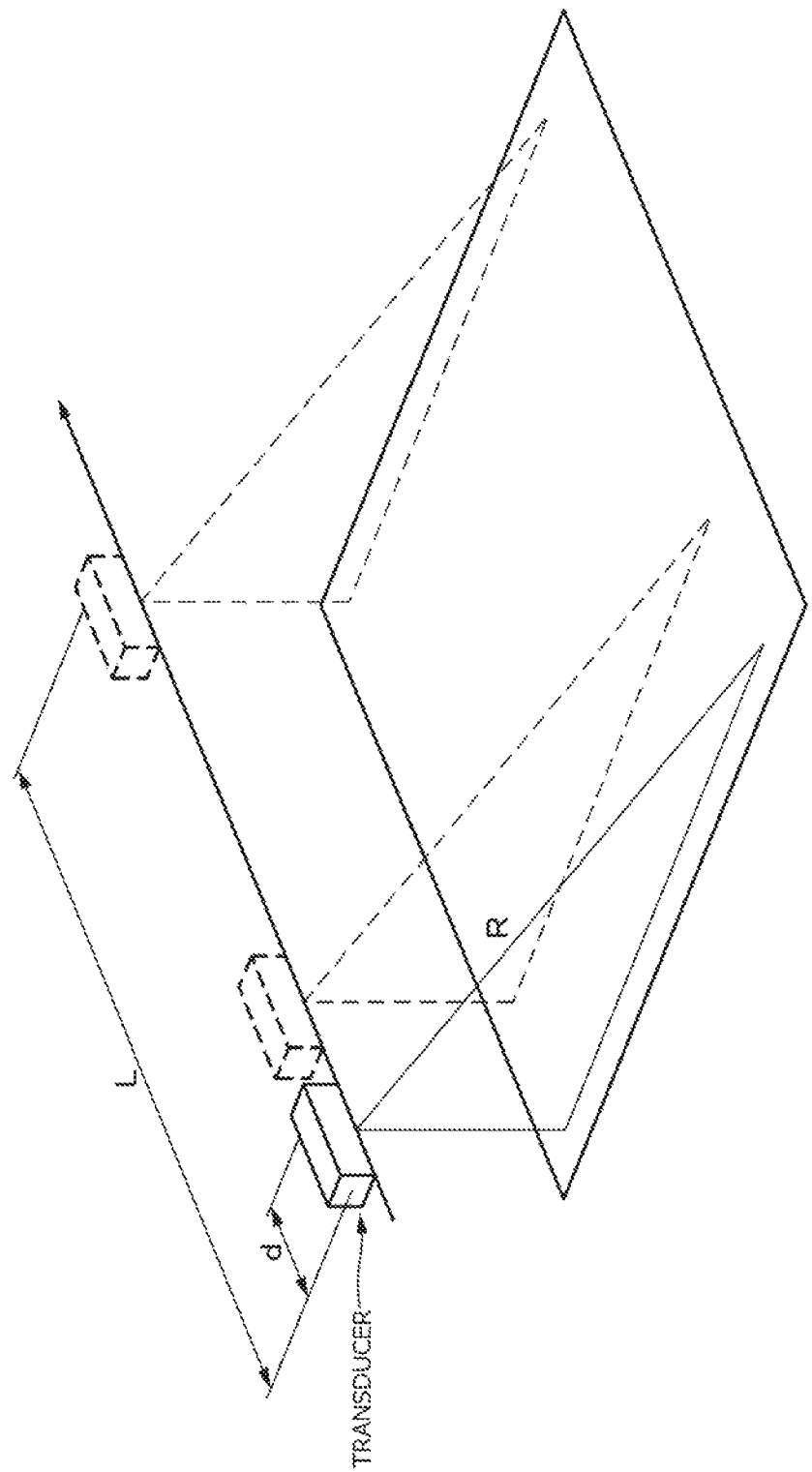
FIG. 21 Schematic diagram for describing a principle of an aperture synthetic side scan sonar.
Figure 22:
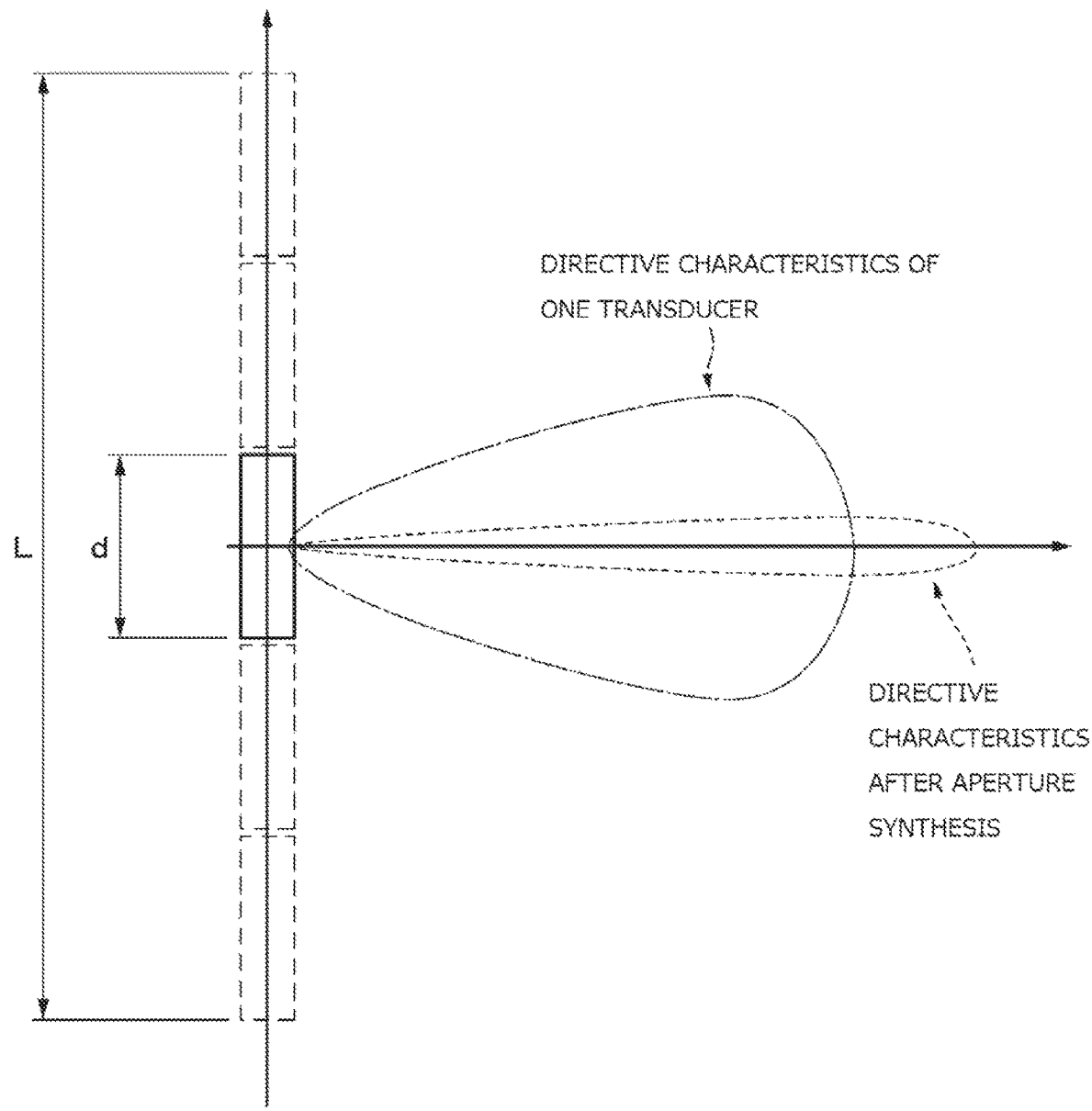
FIG. 22 Schematic diagram for describing directivity characteristics of an aperture synthesis.

Subsequently, an aperture synthesis will be described. The aperture synthesis is a method whereby by moving one transducer, a directivity which is equivalent to that of a transducer of a long aperture is formed, thereby raising the resolution. It is a method whereby, as shown in FIG. 21, the transmission and reception are repeated while moving the transducer of a length d, thereby obtaining a resolution in the horizontal direction which is equivalent to that of a transducer of a length L, and such a method is used as an aperture synthetic sonar. Simply explaining, as shown in FIG. 22, since a directive angle due to the length L of the transducer after the aperture synthesis is sharper than a directive angle due to the length d of the transducer by a value corresponding to their ratio d/L, the resolution is improved.

Figure 23:
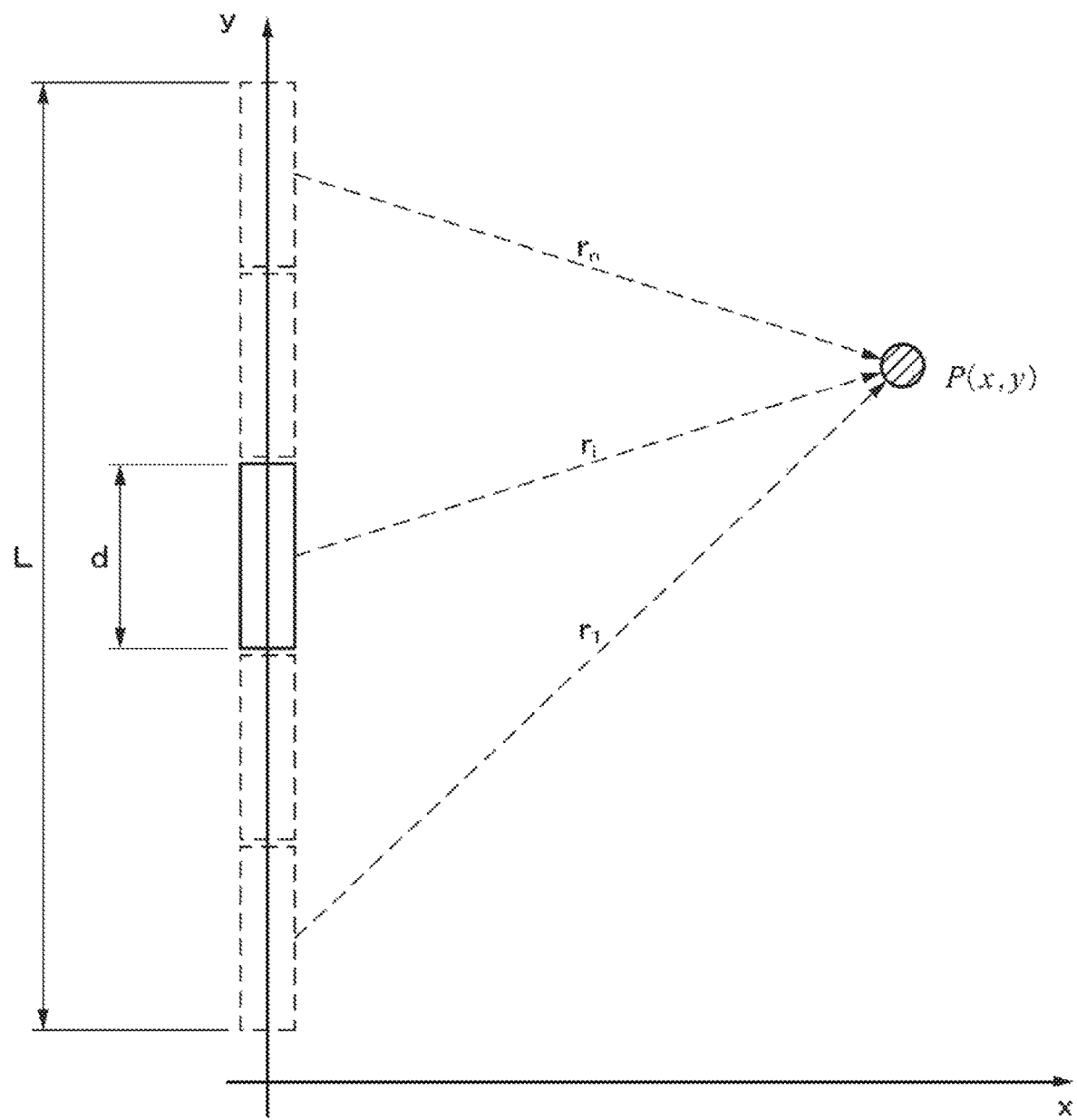
FIG. 23 Schematic diagram for describing a principle of the aperture synthesis.

In a coordinate system shown in FIG. 23, a synthetic signal S(x, y) of a reflection signal from a position of P(x, y) can be expressed by the following equation.

$$s(x, y) = \sum_{i=1}^{n} A_n s_n(t_n(x, y))$$ [Math. 1]

Where, $A_n$ denotes a directional function and $t_n$ indicates a time required for reciprocation to a target P. Assuming that an underwater sound velocity is equal to c, the time $t_n$ can be expressed by the following equation.

$$t_n = \frac{2r_i}{c}$$ [Math. 2]

Figure 24:
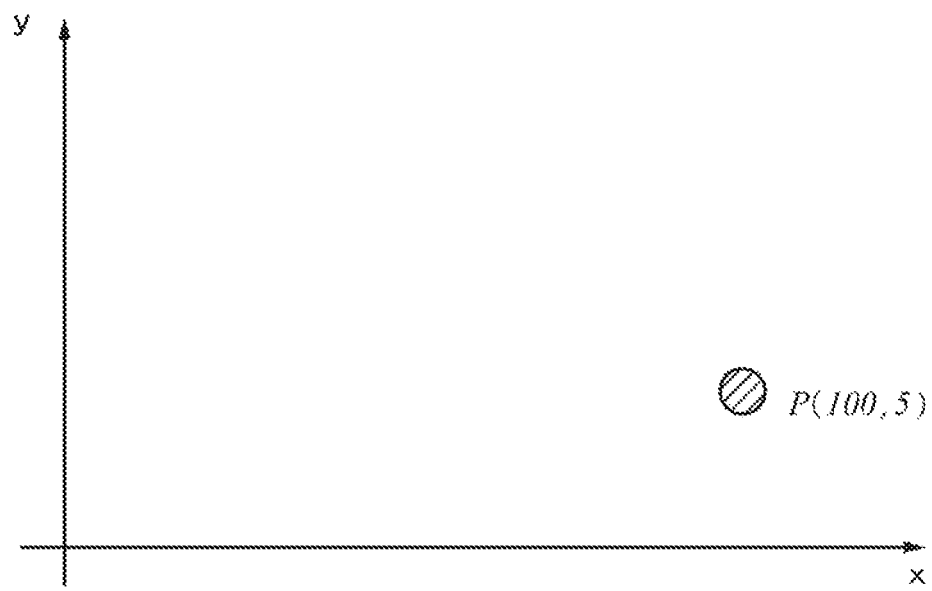
FIG. 24 Schematic diagram showing an example of a point target.
Figure 25:
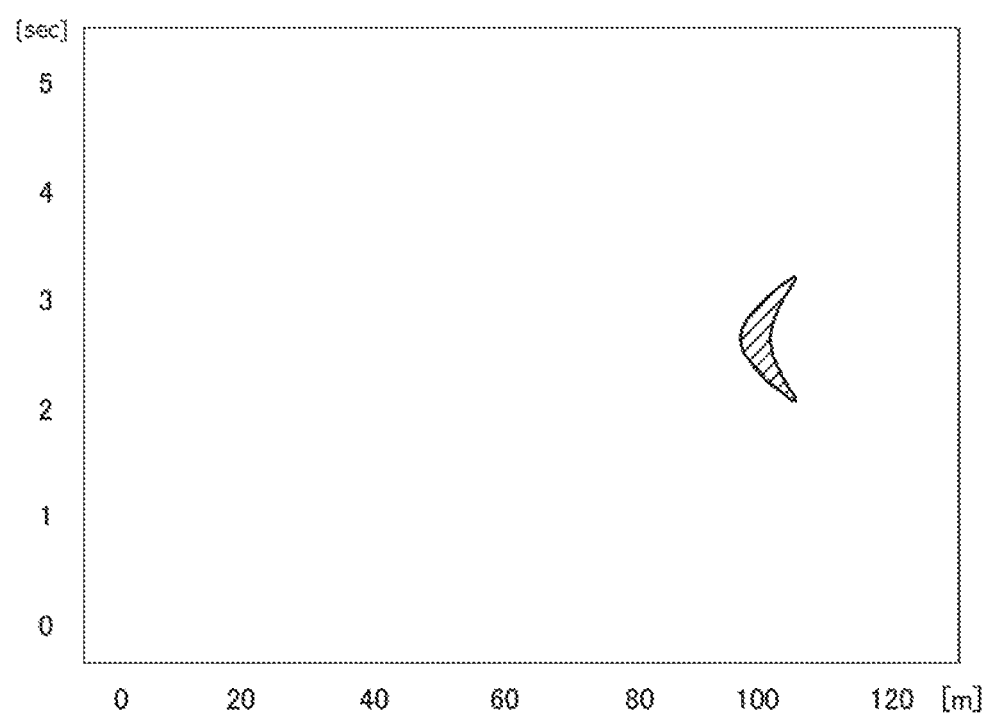
FIG. 25 Schematic diagram showing an image of an example of a point target.
Figure 26:
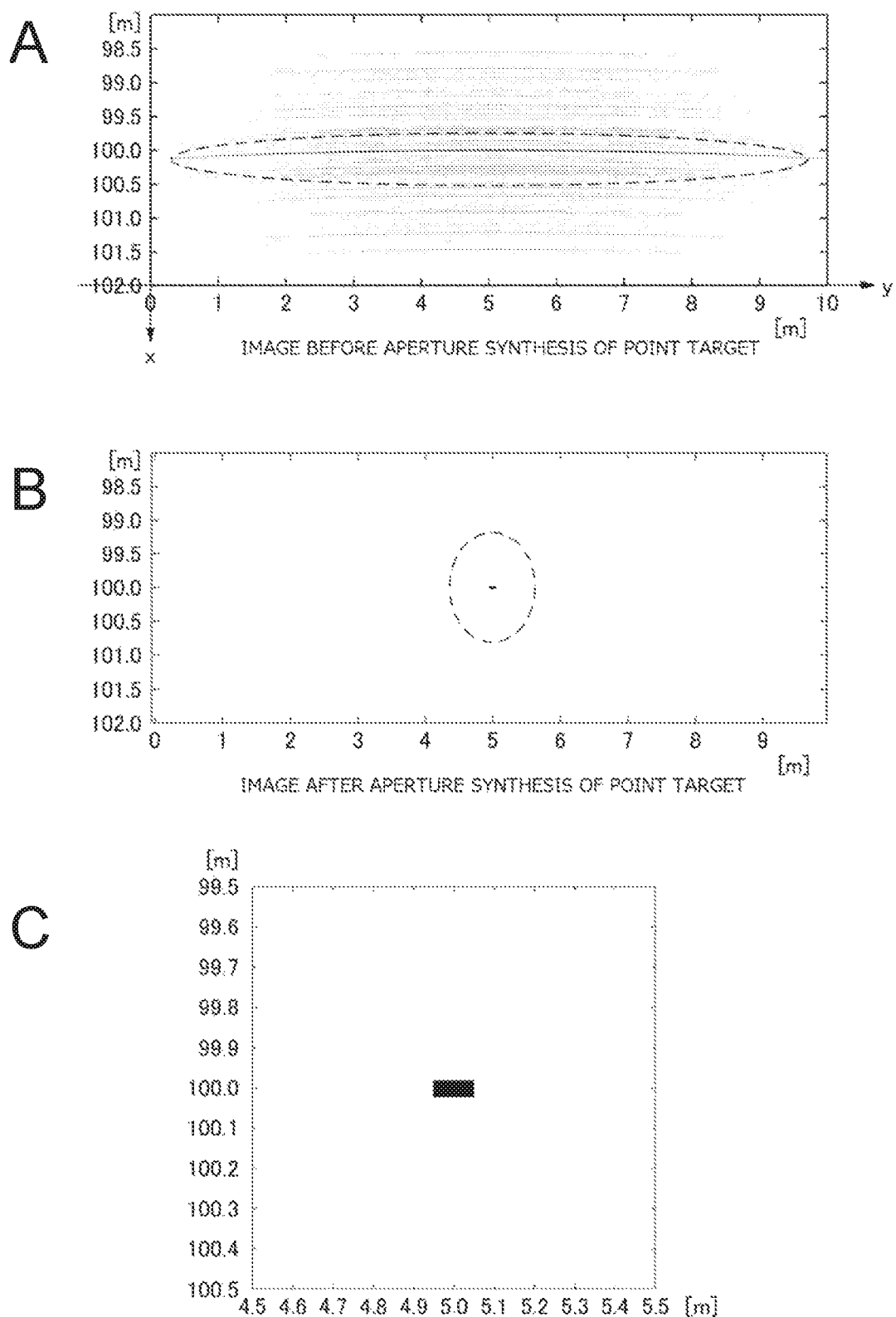
FIG. 26 Schematic diagram showing an image before the aperture synthesis and an image after the aperture synthesis of an example of a point target in the invention.

A point that the resolution is improved by the aperture synthesis will be described by using a computer simulation. Assuming that a point target exists at a position as shown in FIG. 24, according to the echo sounding apparatus or sonar of the conventional system, an echo of this target becomes an image of a circular arc shape as shown in FIG. 25. FIG. 26A shows an image with a part enlarged for the purpose of easy understanding. This image is an image obtained by already using the system according to the first embodiment and is a simulation image of echoes obtained by the transmission of 20 times per second, that is, 100 times on this image.

By processing such an image by using the method of the aperture synthesis, it becomes an image as shown in FIG. 26B. FIG. 26C shows a partial enlarged diagram of FIG. 26B. As will be understood from FIGS. 26B and 26C, the point target can be detected at the resolution of about 0.1 m. As conditions of the aperture synthesis, the transmitting period is set to 0.05 sec (20 times/sec), a moving speed of the transducer is set to 2 m/sec, and an aperture length is set to 10 m.

An image in the case of similarly using the method of the aperture synthesis in the conventional system is as shown in FIG. 27A. When the transmitting period is equal to one time per second, assuming that a moving speed is set to 2 m/sec and an aperture length is set to 10 m, since the transmission can be performed only 5 times, the reception echoes of only 5 times are obtained. Therefore, even if the aperture synthesis is performed, only the image of a low resolution as shown in FIG. 27B is obtained.

Figure 28:
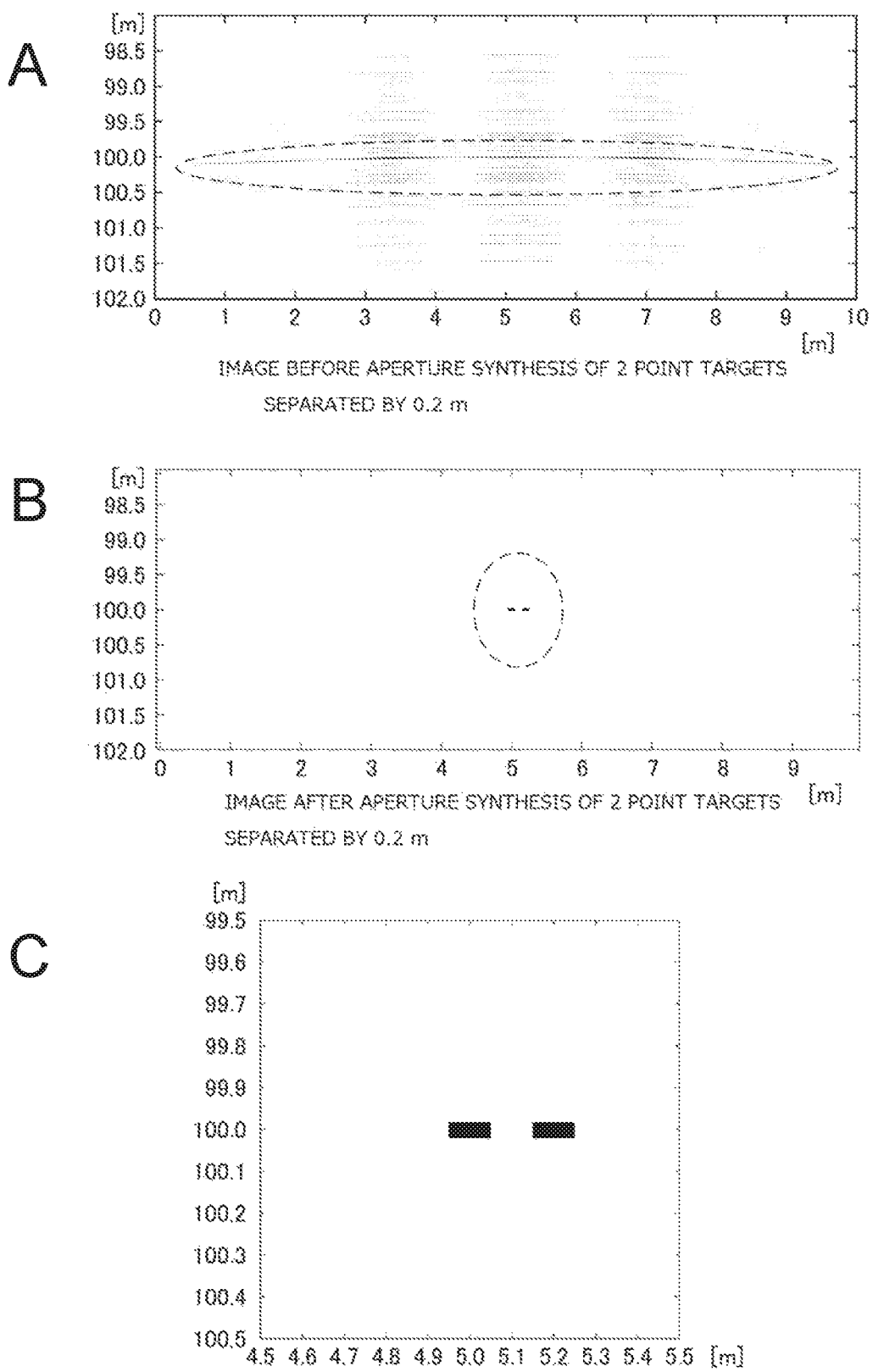
FIG. 28 Schematic diagram showing an image before the aperture synthesis and an image after the aperture synthesis of an example of two point targets in the invention.

FIG. 28 shows an image in the case where two point targets are arranged so as to be separated by 0.2 m. Although the two point targets cannot be separated before the aperture synthesis (FIG. 28A), the two point targets can be separated after the aperture synthesis (FIG. 28B). FIG. 28C shows a partial enlarged diagram of FIG. 28B.

Although the method of the aperture synthesis is an existing technique, by shortening the transmitting period by using the method of the first embodiment, the method of the aperture synthesis can be effectively used. That is, in the conventional aperture synthesis method, in a manner similar to the conventional echo sounding, after the reception echo was returned, the next transmission is performed. Therefore, when a maximum detection distance is set to R, it is necessary that the transmitting period T satisfies a relation of (2R/1500<T) as mentioned above. Thus, when the maximum detection distance is set to R=500 m, since T has to be set to (T>2×500/1500=0.67 sec), the transmitting period is generally equal to one time/sec. On the other hand, if the method of the first embodiment is used, since the transmitting period can be set without being subjected to the restriction of the maximum detection distance, the transmitting period of 20 times/sec can be accomplished and the aperture synthesis can be effectively used.

Advantages of the foregoing first embodiment are as follows.

In the conventional echo sounding apparatus or the like, there is a restriction in the velocity of the sound wave in the water. However, in the first embodiment, such a restriction is eliminated. The restriction of the velocity of the sound wave in the water means that in the conventional echo sounding apparatus or the like, after the transmission signal was transmitted, the echo signal of the sea bottom or the like is received and, subsequently, the next transmission signal is transmitted.

In the case of executing the aperture synthesis process in the conventional echo sounding apparatus or the like, the transmitting period cannot be shortened due to such a restriction. Therefore, in order to increase the reception data in the aperture, it cannot help using only the method of reducing the ship velocity. If the technique of the first embodiment is used, since the transmission signals can be transmitted at the transmitting period which is a few to tens of times as high as that in the conventional echo sounding apparatus or the like, when the aperture synthesis is executed, it is predominantly advantageous as compared with the related arts.

Since the transmitting period cannot be shortened due to the restriction of the velocity of the sound wave and, in many cases, there is no correlation between the reception signal and the preceding reception signal, at is difficult to improve the S/N ratio by performing an addition of a plurality of reception signals or the like. On the other hand, in the first embodiment, since the transmitting period can be remarkably shortened, there is a correlation between the front and rear signals. Therefore, since the S/N ratio can be improved by performing an addition of the front and rear reception signals or the like, even when the transmission output is low, the reception signals can be added and a miniaturization and a design for saving electric power consumption of the apparatus can be accomplished.

A radar is known as a technique which is analogous to a fish-finder. Since the radar is an apparatus which is used in the air, it uses radio waves. A velocity of the radio wave is equal to 300000 km/sec and is a speed which is 200000 times as high as the velocity (1.5 km/sec) of the sound wave in the water. Therefore, even if a detection range of the radar is set to, for example, 100 km, a reciprocating time of the radio wave of 100 km is equal to (0.00067 sec=0.67 msec). The transmitting period of 1 msec can be attained. That is, even if the transmission is performed 1000 times per second, the transmission signal does not overlap with the reception echo. On the other hand, if it is intended to detect the sea bottom of 1000 m in the water, since the receiving echo signal is returned after (1000×2/1500=1.33) seconds, the transmitting period is equal to about 1.5 seconds. In the radar and the echo sounding apparatus, there is a ratio of (1.5 seconds/1 msec=1500 times) between the actual detection range (100 km) and 1000 m. It will be understood that the velocity of the sound wave fairly exerts a restriction to the transmitting period of the underwater echo apparatus such as an echo sounding apparatus or the like. If the echo measuring apparatus according to the first embodiment is used, such a restriction is eliminated and the transmitting period can be remarkably shortened. Therefore, an epoch-making echo sounding apparatus or the like can be designed.

3. Second Embodiment

Figure 29:
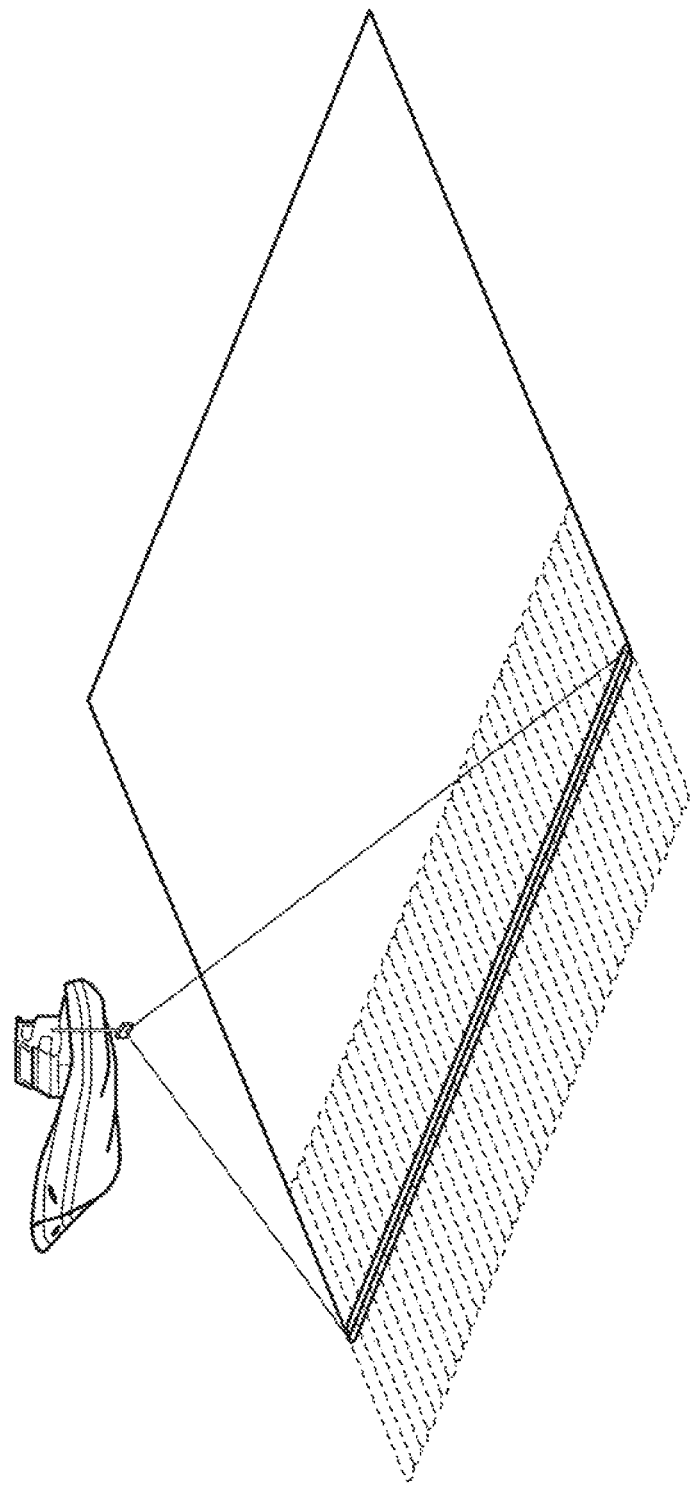
FIG. 29 Schematic diagram for use in description of a multibeam echo sounder.
Figure 30:
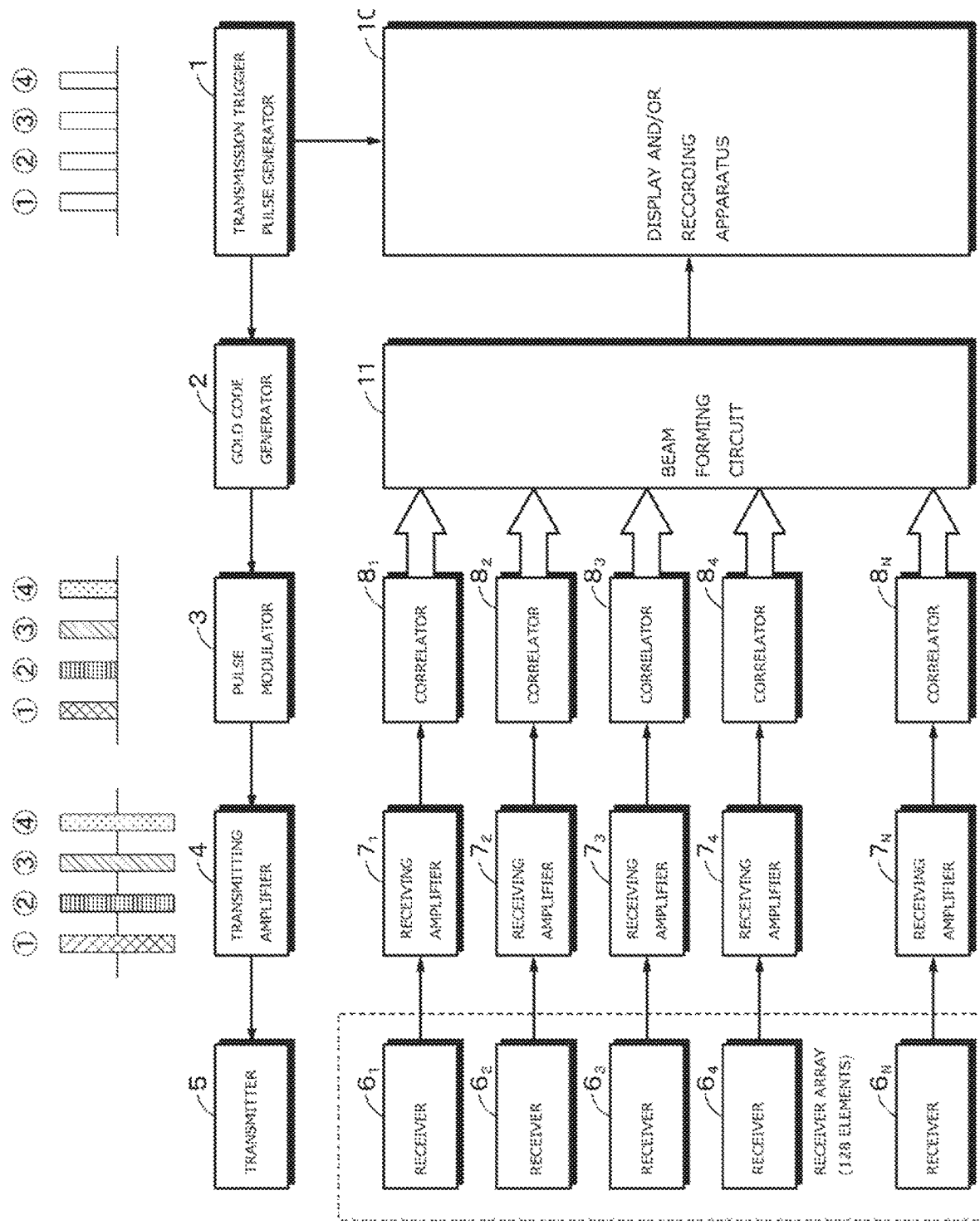
FIG. 30 Block diagram showing a construction of the second embodiment in the case where the invention is applied to the multibeam echo sounder.

A multibeam echo sounder will be described as a second embodiment of the invention. As shown in FIG. 29, the multibeam echo sounder has a directivity called a fan beam which is narrow in the progressing direction of a ship and is wide in the right/left direction, and a transmission signal is transmitted from one transmitter. Since such an apparatus has a plurality of beams which are wide in the front/rear direction of the ship and are narrow in the right/left direction so as to cross the transmission beam, it is called a multibeam echo sounder. FIG. 30 shows a construction of a multibeam echo sounder of the second embodiment.

In a manner similar to that mentioned above, as a construction of the transmitting side, the transmission trigger pulse generator 1, gold code generator 2, pulse modulator 3, transmitting amplifier 4, and transmitter 5 are provided. An underwater ultrasonic wave is transmitted from the transmitter 5. The transmission signal is a signal having a transmitting period in a range from a few to tens of Hz.

Different from the receiving unit of the single beam echo sounder, a receiving unit of the multibeam echo sounder has a plurality of receivers $6_1$ to $6_N$. Receiving amplifiers $7_1$ to $7_N$ are connected to the receivers $6_1$ to $6_N$. Correlators $8_1$ to $8_N$ are connected to the receiving amplifiers $7_1$ to $7_N$. Output signals from the correlators $8_1$ to $8_N$ are input to a beam forming circuit 11 every gold code, a beam forming is performed, and a plurality of reception beams are formed.

As disclosed in, for example, the Description of U.S. Pat. No. 4,159,462, the beam forming circuit 11 is a circuit including: analog delay circuits to which the outputs of the correlators $8_1$ to $8_N$ are respectively supplied; a delay selecting matrix for providing a predetermined delay by selecting delay elements of the analog delay circuits; and an adding circuit for adding outputs of the analog delay circuits. An output of the beam forming circuit 11 is supplied to the display and/or recording apparatus 10. A time which is required until an echo is received in response to a transmission pulse is displayed and/or recorded, respectively. Even in the case where the improved echo measuring apparatus is applied to such a multibeam echo sounder, an operation and effects similar to those mentioned above can be obtained.

4. Third Embodiment

Figure 1:
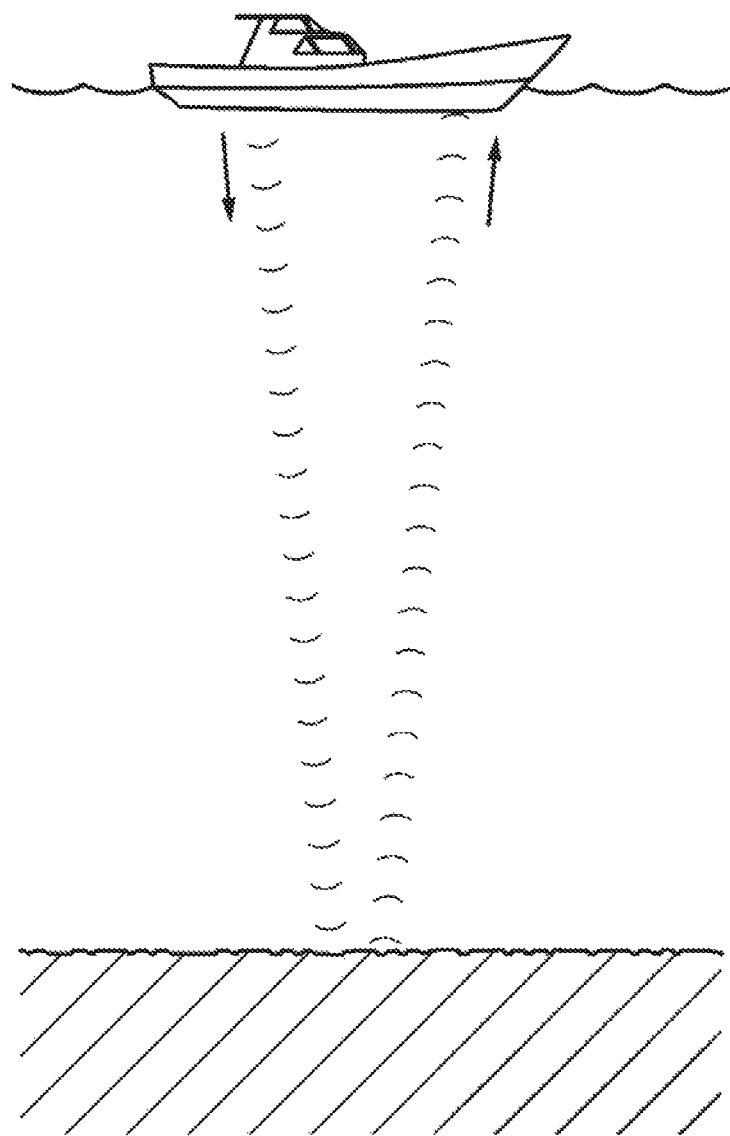
FIG. 1 Schematic diagram showing a principle of an echo sounding.
Figure 2:
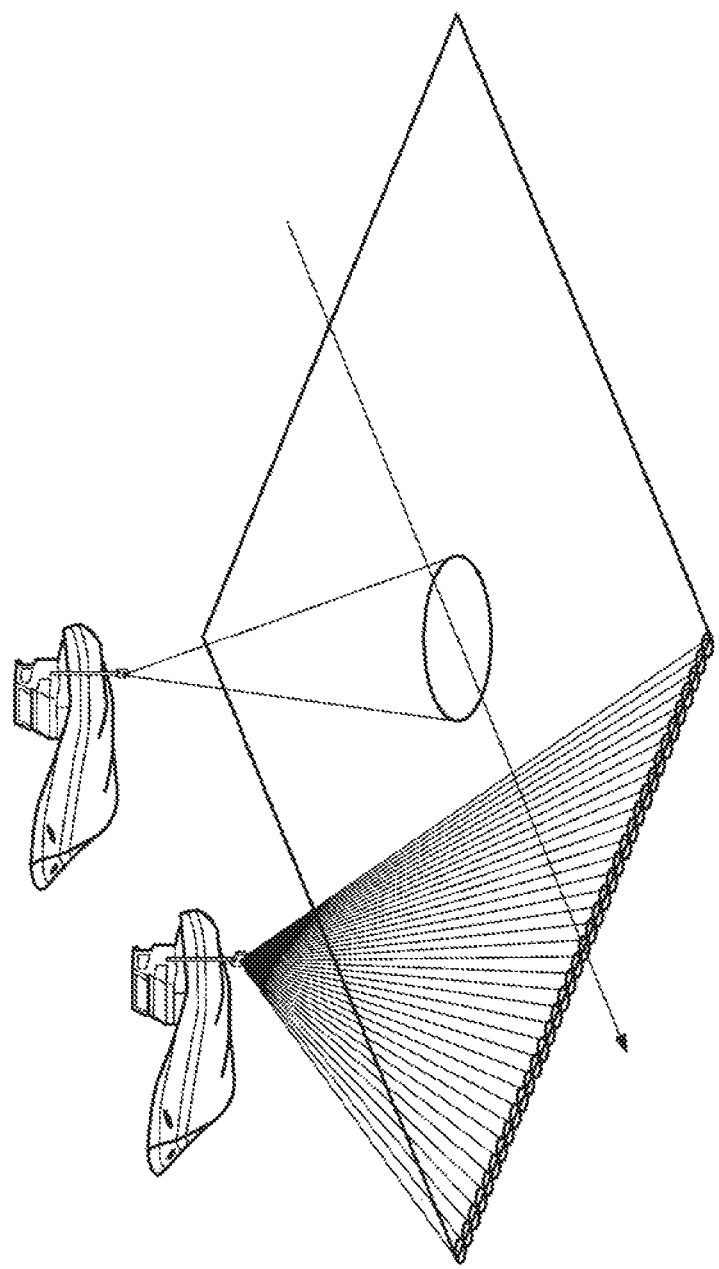
FIG. 2 Schematic diagram for describing a single beam sounding and a multibeam sounding.
Figure 3:
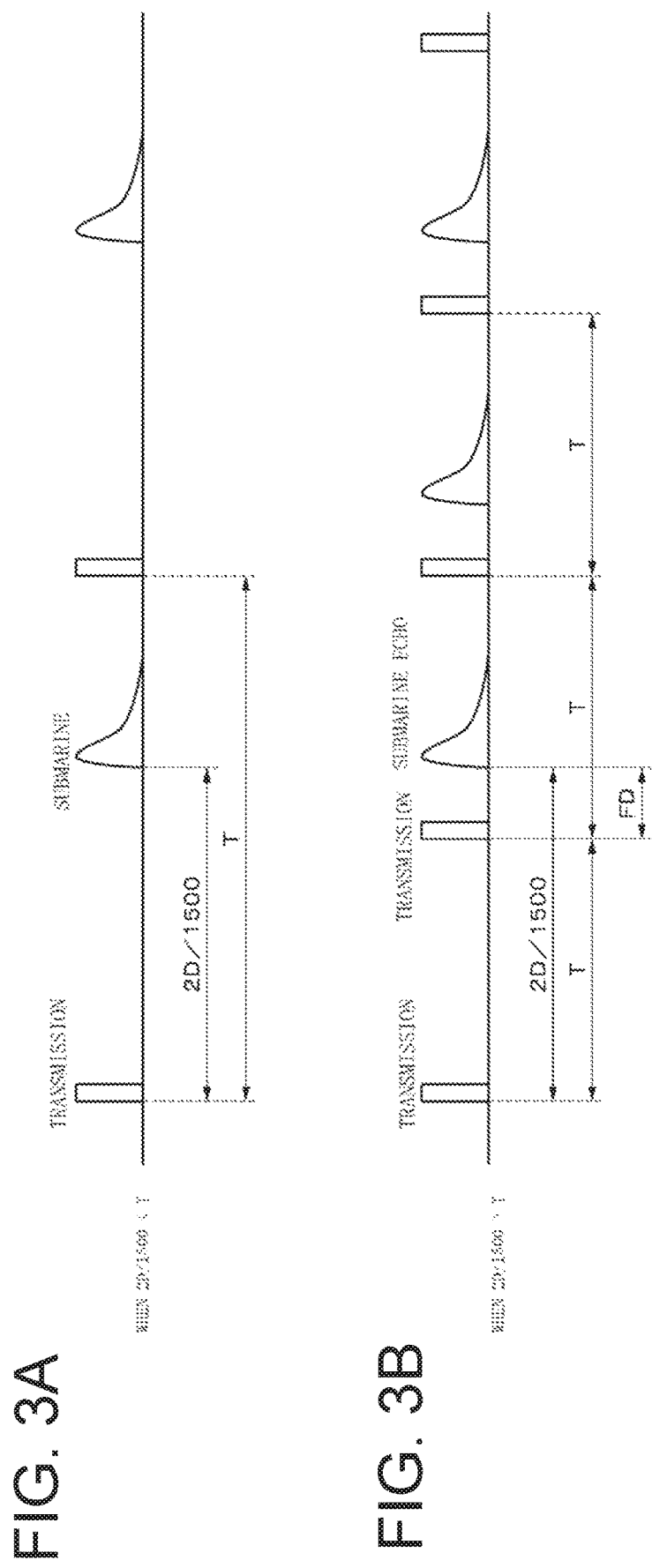
FIG. 3 Waveform diagrams for use in description of a conventional echo sounding apparatus.
Figure 4:
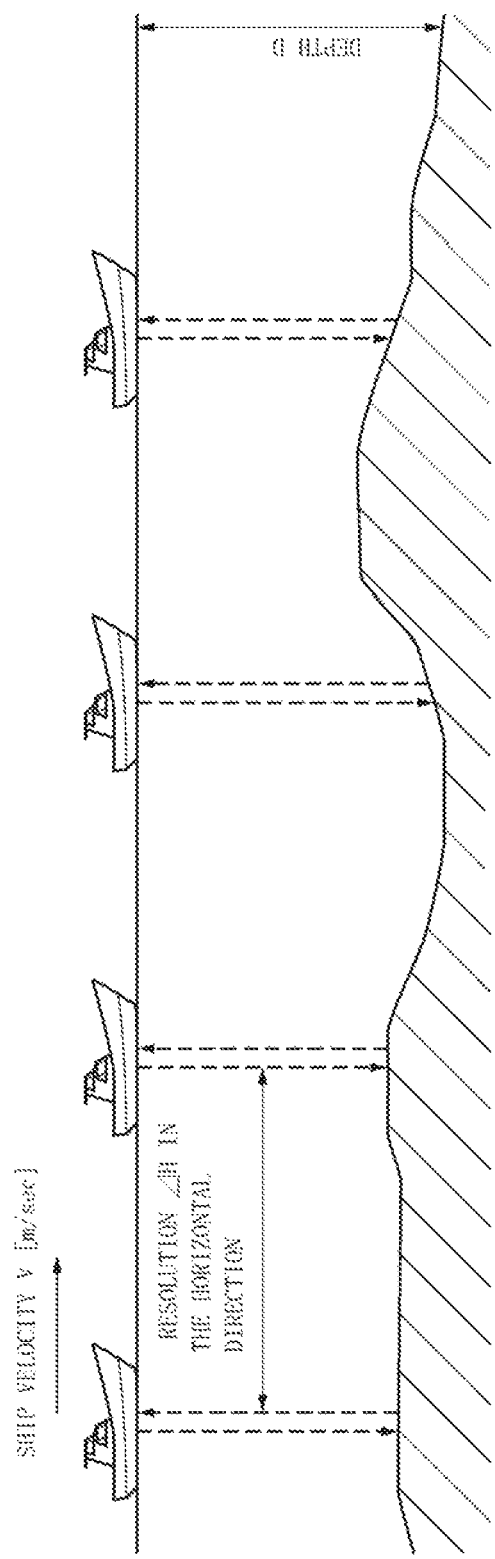
FIG. 4 Schematic diagram for use in description of a resolution in the horizontal direction of the conventional echo sounding apparatus.
Figure 5:
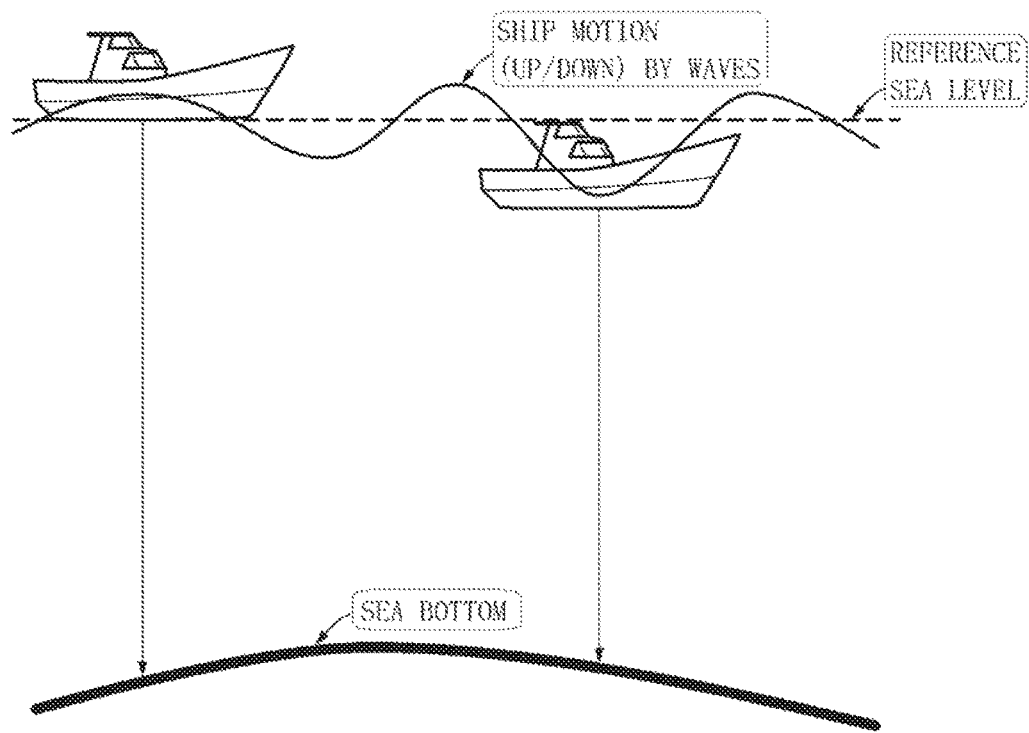
FIG. 5 Schematic diagram for describing a ship motion due to waves.
Figure 6:
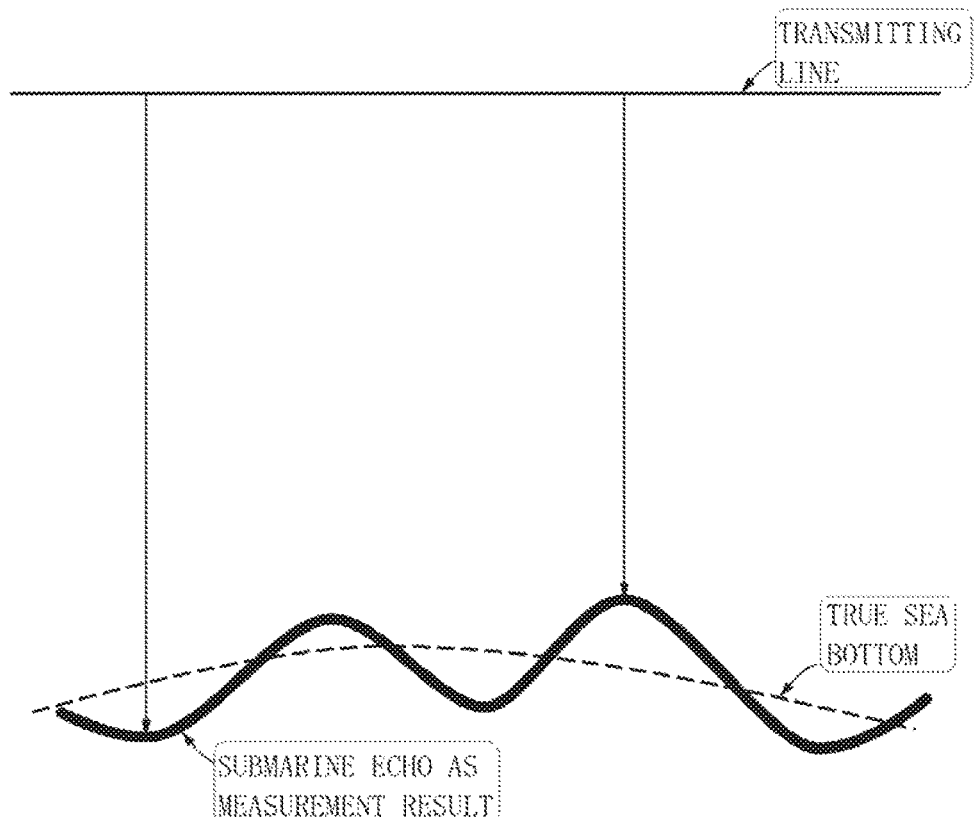
FIG. 6 Schematic diagram for describing an influence of a ship motion due to waves.
Figure 31:
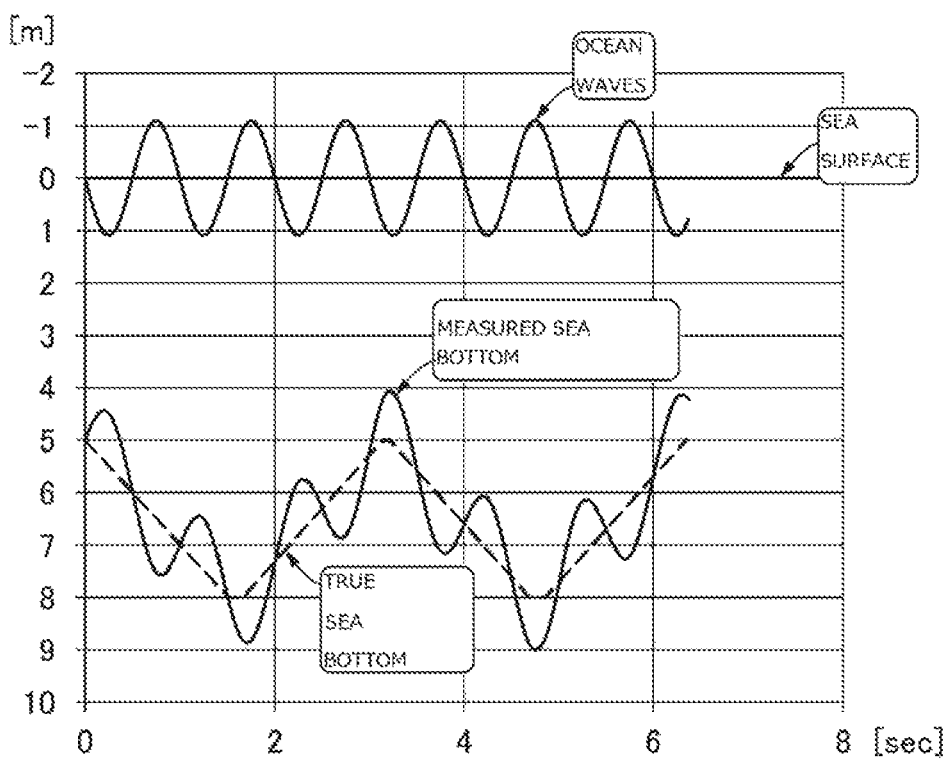
FIG. 31 Schematic diagram for use in description of a ship motion due to ocean waves.
Figure 32:
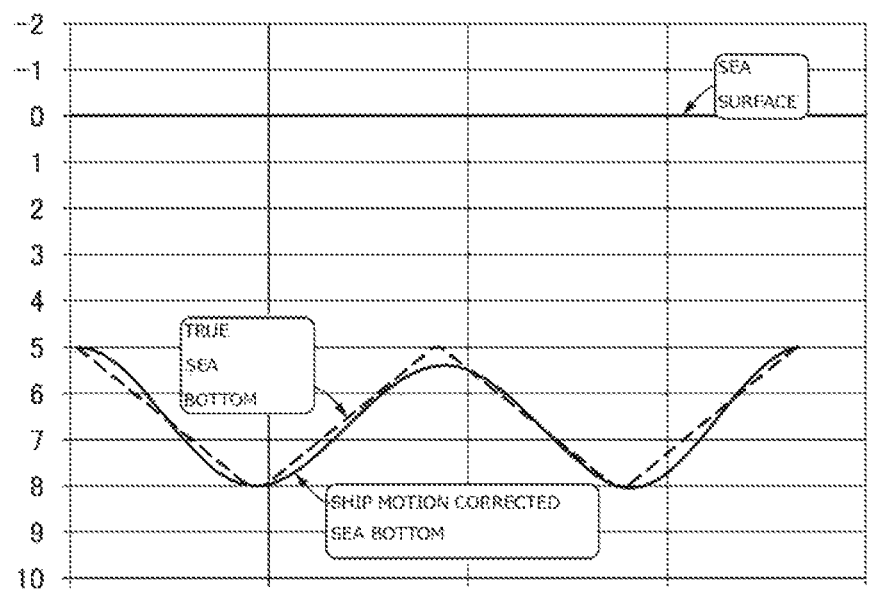
FIG. 32 Schematic diagram showing a sea bottom which was ship motion corrected.

The third embodiment of a ship motion correcting apparatus according to the invention will be described. As described with reference to FIGS. 5 and 6, in the case of measuring the sea bottom (which denotes the sea bottom surface) by an ultrasonic wave, a depth which is measured becomes deeper or shallower than the true sea bottom because the reference sea level is subjected to a ship motion of the waves. FIG. 31 shows submarine measurement values which are obtained by measuring the actual sea bottom in the case of assuming that a period of the ship motion of a ship by the waves is equal to 1 Hz and an upper/lower motion is equal to ±1 m. The measurement value of the sea bottom by the echo sounder changes by an influence of the ship motion. When the ship is lifted up by the waves, the measurement value is detected as a value deeper than the actual depth of the sea bottom (shown by a broken line). When the ship is lifted down, it is detected as a value shallower than the actual depth. In the example of FIG. 31, it will be understood that the depth data (solid line) obtained by the measurement is subjected to an influence of the ship motion as compared with the true sea bottom (broken line). A result obtained by performing the ship motion correction is shown in FIG. 32. As shown in FIG. 32, as a result obtained by eliminating the ship motion component due to the waves, the true sea bottom can be almost detected. When the sea bottom is relatively flat, the ship motion by the waves can be detected as a change in depth. In the foregoing echo sounding apparatus, since the period of the transmission signal can be shortened, the ship motion component by the waves can be detected. Although ship motion components other than the change in the vertical direction (change in depth) exist, since a component of shaking is also contained in the detected ship motion component, there is no need to especially handle the ship motion component. From such a viewpoint, in the invention, assuming that a velocity of the sound wave in the water is equal to Vu and a depth is equal to D, the period of the transmission signal is equal to or less than (2D/Vu) and satisfies a sampling theory as compared with the period of the ship motion component.

In the third embodiment of the invention, the ship motion correction is performed by eliminating the ship motion component from the measurement data by the frequency separation on the basis of a fact that the change in ship motion component (for example, waves) is severer than the change in true depth of a target (for example, sea bottom). When the depth change is severer than the change in ship motion component, it is difficult to perform the ship motion correction by the third embodiment of the invention. Actually, in many cases excluding a reef zone where ups and downs are extremely large, the ship motion correction by the third embodiment of the invention can be applied.

Figure 33:
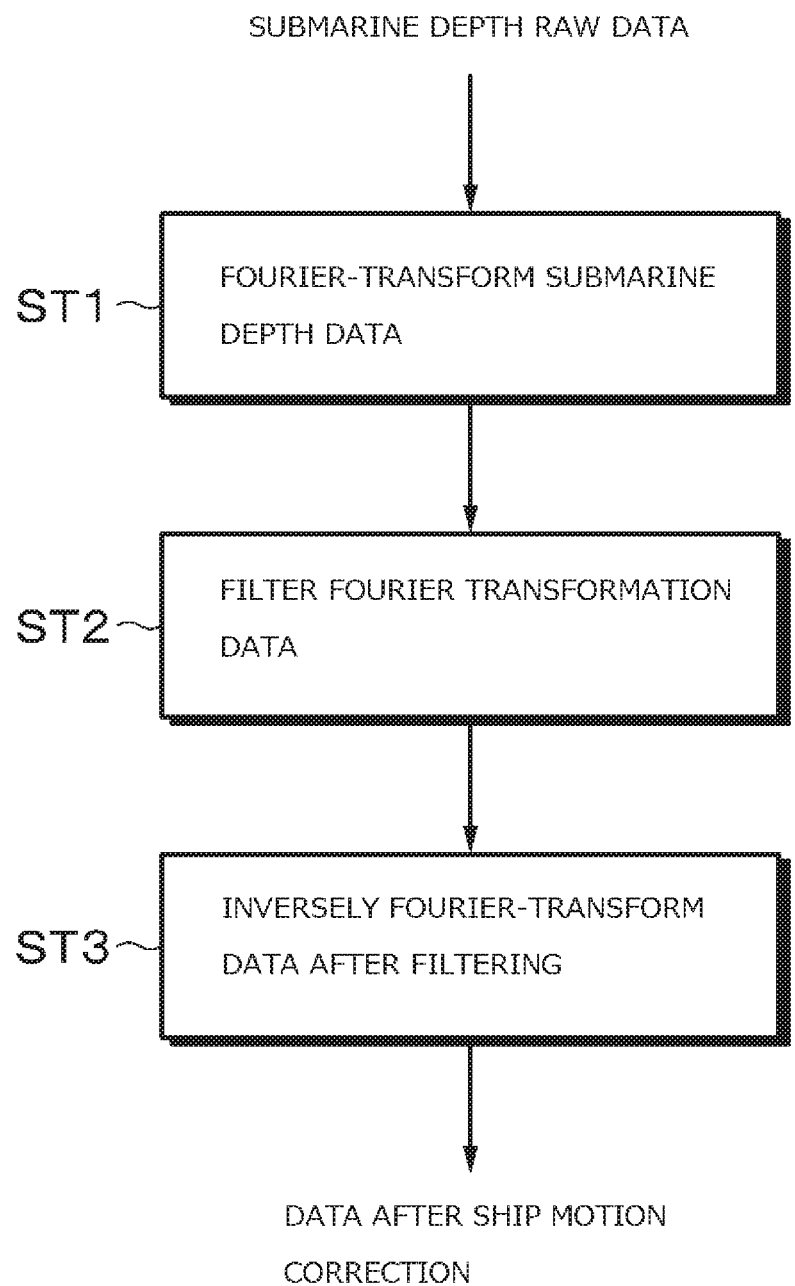
FIG. 33 Flowchart for describing an example of a ship motion correction in the third embodiment of the invention.

According to an example of a frequency separating method, the depth data of the sea bottom is Fourier-transformed, the ship motion component is eliminated by using such a filter as to eliminate a frequency region which is considered as a ship motion component, and thereafter, by executing an inverse Fourier transformation, only a component close to the true sea bottom is reproduced. FIG. 33 is a flowchart showing a flow of such a process.

Figure 34:
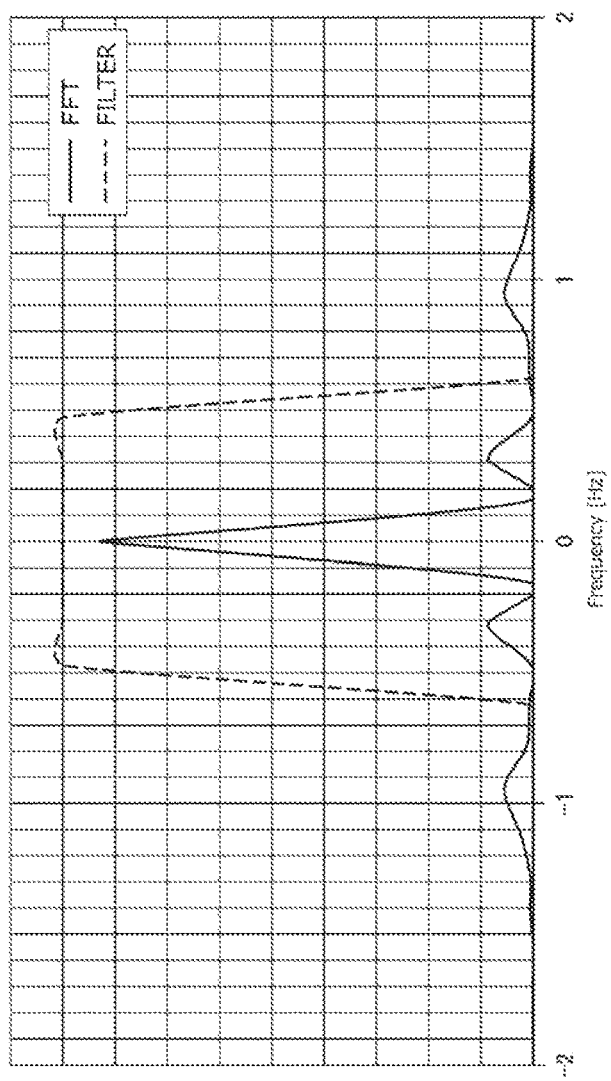
FIG. 34 Schematic diagram for describing an example of a ship motion correction in the third embodiment of the invention.

Step ST1: The submarine depth data is Fourier-transformed. As a result of the Fourier transformation, for example, as shown in FIG. 34, Fourier transformation data containing the ship motion component is obtained. A peak at the center of FIG. 34 indicates a frequency component of the true sea bottom and a small mountain near 1 Hz indicates a frequency component of the ship motion by the waves.

Step ST2: The Fourier transformation data is filtered. That is, as shown by a broken line in FIG. 34, a process for eliminating components of 0.5 Hz or higher is executed, thereby eliminating the component of the small mountain near 1 Hz.

Step ST3: The data after the filtering is inversely Fourier-transformed. Thus, as shown by a solid line in FIG. 34, data of the sea bottom which is analogous to the ups and downs of the true sea bottom is obtained. When the invention is actually applied, by preliminarily predicting or measuring components of the waves and eliminating such frequency components, the depth of the true sea bottom can be obtained.

Figure 35:
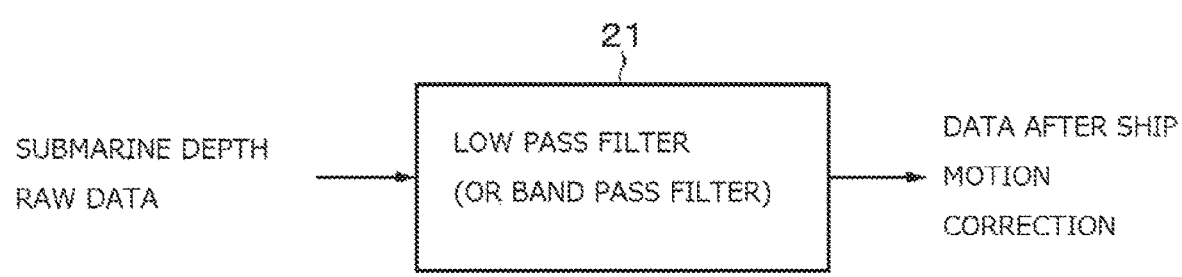
FIG. 35 Block diagram for describing another example of the ship motion correction in the third embodiment of the invention.
Figure 36:
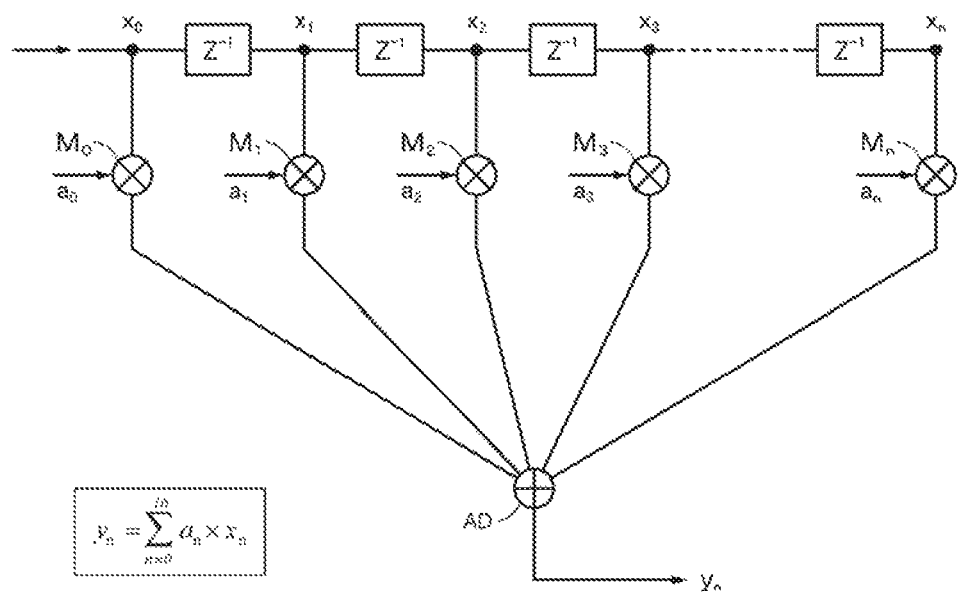
FIG. 36 Block diagram for describing another example of the ship motion correction in the third embodiment of the invention.

According to another example of the frequency separating method, as shown in FIG. 35, the submarine depth raw data is supplied to a low pass filter (or band pass filter) 21, thereby eliminating the ship motion component. The submarine depth raw data contains the ship motion component and denotes data before the ship motion correction. As a low pass filter (or band pass filter) 21, as shown in FIG. 36, for example, a construction of an FIR (Finite Impulse Response) filter can be used. A digital filter of a construction of an IIR (Infinite Impulse Response) may be used. In FIG. 36, the input data is supplied to a serial connection of unit delay elements Z. A plurality of samples extracted from nodes of the serial connection are multiplied by coefficients $a_0$ to $a_n$ by multipliers $M_1$ to $M_n$, respectively. Outputs of the multipliers $M_1$ to $M_n$ are added by an adder AD, so that output data $y_n$ is obtained. A digital filter of desired frequency characteristics can be constructed by the coefficients $a_0$ to $a_n$.

Figure 37:
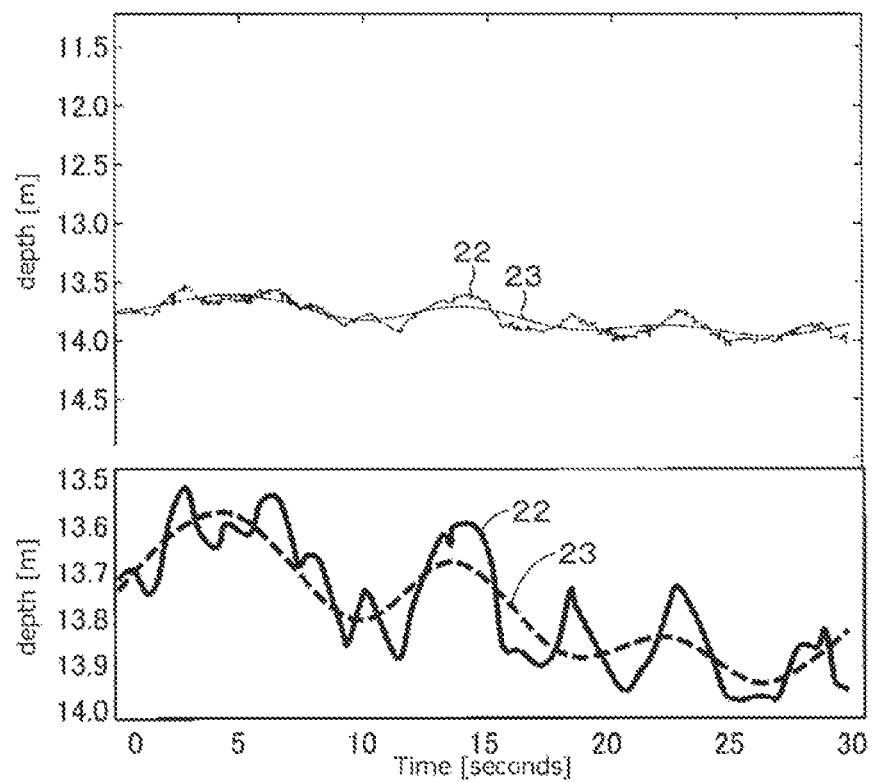
FIG. 37 Schematic diagram showing data before the ship motion correction and data after the ship motion correction.

FIGS. 37A and 37B show an example in the case where the submarine depth raw data obtained at the transmitting period of 100 times per second is input to the low pass filter (or band pass filter) 21 and the submarine depth data in which the ship motion correction has been performed to an output of the low pass filter (or band pass filter) 21 is obtained. In FIGS. 37A and 37E, a solid line 22 indicates submarine depth raw data and a broken line 23 indicates submarine depth data obtained after the ship motion correction. The data showing the true submarine depth is obtained by the ship motion correction.

A specific example of the ship motion correction in the third embodiment of the invention will now be described with reference to FIG. 38. The depth data is collected and recorded by using the echo sounder of the invention shown in FIG. 7. The collected and recorded depth data is data consisting of time and a depth value as shown in FIG. 18. In this example, it is depth data obtained by performing the transmission 20 times per second. Naturally, if the transmission is performed 100 times per second, further fine depth data can be obtained. By inputting the obtained depth data to the batch processing flow shown in FIG. 33, the ship motion correcting process can be executed.

5. Fourth Embodiment

Figure 39:
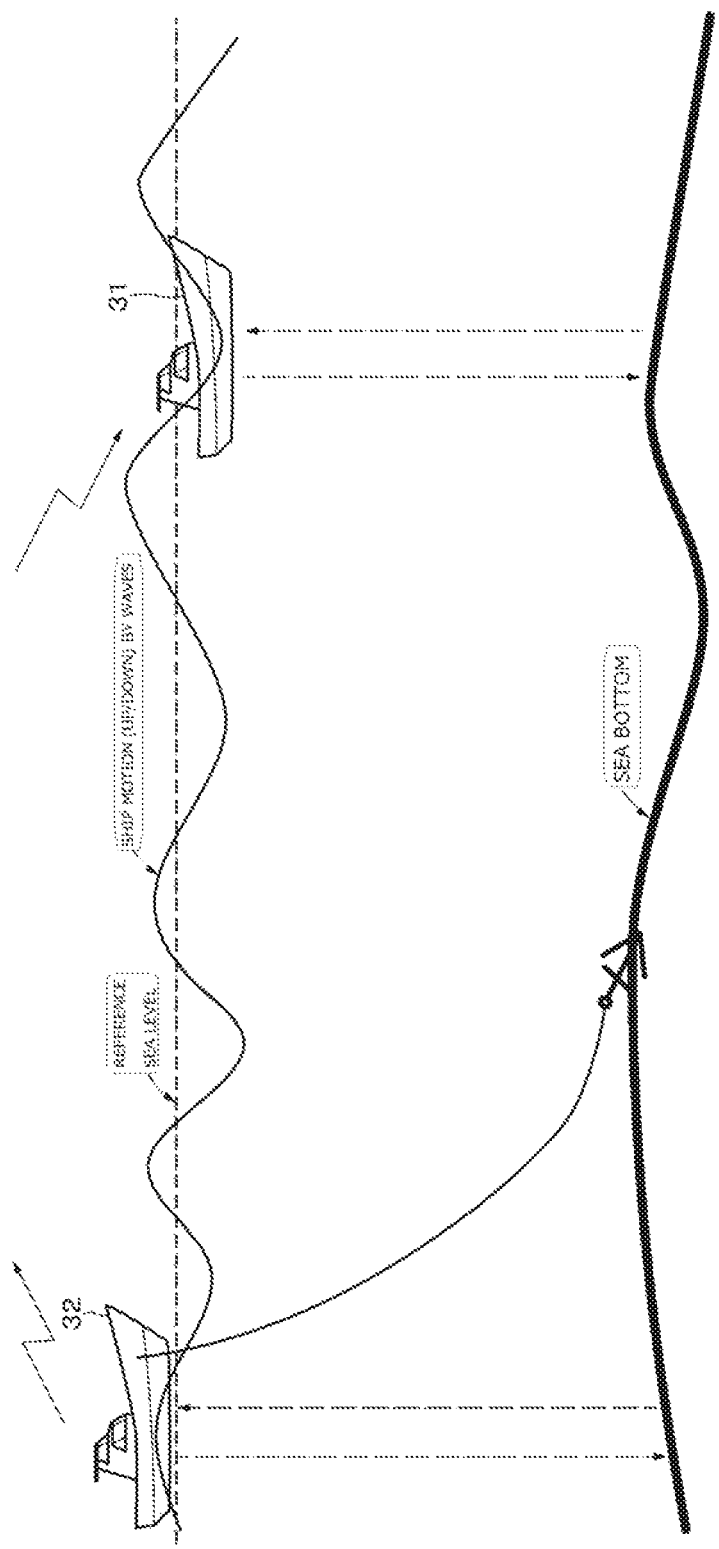
FIG. 39 Schematic diagram for describing the fourth embodiment of the invention.

According to the fourth embodiment of the invention, a ship motion component is detected by a ship which is at rest and is floating on the sea surface (a buoy may be used) and the ship motion correction is performed by the detected ship motion component in a semi-real-time manner. As shown in FIG. 39, in the case where a research ship 31 for depth observation sails at a predetermined speed along a predetermined course, a ship 32 to detect the ship motion component is at rest and is floated in an area of sea which will be subjected to almost the same influence of waves as that of the research ship. The ship motion component detected by the ship 32 is transmitted to the research ship 31 in a radio manner. In the research ship 31, the ship motion correction is performed based on the ship motion component received from the ship 32.

As shown in FIG. 40, the ship 32 has: a transmitter 41 for transmitting an ultrasonic wave to the sea bottom; and a receiver 42 for receiving an echo from the sea bottom. A ship motion detecting unit 43 is connected to the transmitter 41 and the receiver 42. The ship motion detecting unit 43 obtains depth data by a construction and a signal process which are similar to those in the foregoing depth measurement shown in FIG. 7. Although the depth ought to be constant since the ship 32 is at rest in the same location, since the ship performs a vertical motion due to the waves, such depth data is data consisting of only the ship motion component. The ship motion data is supplied to a radio communicating unit 44 and the transmission data containing the ship motion data is transmitted to the research ship 31.

An echo sounding apparatus similar to that in the foregoing depth measurement shown in FIG. 7 is provided for the research ship 31. Only a partial construction related to the ship motion correction is shown in FIG. 40. The depth raw data which was received by the receiver 6 and is output from the receiving amplifier 7 is supplied to a low pass filter or band pass filter 48. The ship motion data from the ship 32 is received and the ship motion data is output from a radio communicating unit 45. The ship motion data is supplied to an adjusting circuit 46.

The adjusting circuit 46 Fourier-transforms the transmitted ship motion data, detects a frequency component of the ship motion due to the waves, and forms a control signal on the basis of a detection result. The control signal is used to control a cut-off frequency of the low pass filter or band pass filter 48 so as to eliminate the frequency component of the ship motion component. The control signal is supplied as a control signal of the cut-off frequency of the low pass filter or band pass filter 48. Thus, the ship motion correction can be performed in a semi-real-time manner.

According to the fourth embodiment of the invention, since the ship motion correction is performed by using the ship motion data which was actually detected, a precision can be raised. Although the ship for detection, the buoy, and the like besides the research ship are necessary, the costs can be reduced by shading the ship for detection, the buoy, and the like by a plurality of research ships. The echo sounding apparatus of the ship for ship motion detection is constructed in a manner similar to the echo sounding apparatus of the research ship, a role of the ship for ship motion detection and a role of the research ship can be easily exchanged, and the costs can be reduced by devising an operation plane.

6. Application

The invention can be also applied to the foregoing aperture synthetic sonar. In the synthetic aperture sonar, a transducer is provided for the research ship and an ultrasonic wave is irradiated toward the sea bottom from the transducer. An echo signal is received from the sea bottom. In accordance with a movement of the research ship, sound waves are sequentially transmitted from the transducer, so that reception signals are also sequentially obtained. By executing a synthetic aperture process to a plurality of reception signals, a synthetic aperture image is produced. The invention can be applied to the ship motion correction in such an aperture synthetic sonar.

The invention also incorporates a system in which a transmission and a reception of an ultrasonic wave are performed by using a transducer constructed by a piezoelectric transducer array. A transmission beam is irradiated in a fan shape from a ship toward the sea bottom and the sea bottom is observed through reception beams. Thus, the sea bottom of a portion where a transmission beam range and a reception beam range overlap is examined. According to a multibeam method, by forming a reception beam, every bearing, having such a predetermined beam pattern that a main beam is directed to such a bearing, an intensity of the ultrasonic echo can be estimated every bearing. The invention can be applied to the ship motion correction in such a multibeam method.

7. Modification

Although a plurality of embodiments of the invention have specifically been described above, the invention is not limited to the foregoing embodiments but various kinds of modifications based on the technical idea of the invention are possible. For example, the constructions, methods, steps, shapes, materials, numerical values, and the like mentioned in the foregoing embodiments are nothing but examples. Different constructions, methods, steps, shapes, materials, numerical values, and the like may be used in accordance with necessity. For example, in the case of performing the correlation detection, after the receiving echo signal was demodulated into a code, a correlation can be also detected. Further, although the echo sounding apparatus has been described above, the invention can be applied to an apparatus using an echo sounding technique such as multibeam echo sounding apparatus, side scan sonar, fish-finder, scanning sonar, or the like. Further, the invention is not limited to the ocean waves on the sea but can be also applied to a ship motion correction of an echo sounding apparatus in the fresh water.

The functions of the processing apparatuses in the foregoing embodiments can be recorded as a program into a recording medium such as magnetic disk, magnetooptic disk, ROM, or the like. Therefore, by reading such a recording medium by a computer and executing by an MPU (Micro Processing Unit), a DSP (Digital Signal Processor), or the like, the functions of the echo measuring apparatus can be realized.

REFERENCE SIGNS LIST

1 Transmission trigger pulse generator
2 Gold code generator
3 Pulse modulator
5 Transmitter
6 Receiver
8 Correlator
10 Display and/or recording apparatus
21 Low pass filter or band pass filter
SR Shift register
$EXA_1$~$EXA_{127}$ Arithmetic operating circuits

The invention claimed is:

1. An echo measuring apparatus which is attached to a moving object and detects a measurement target in the water, comprising:
    a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
    a transmitting unit configured to transmit sequentially the transmission signal as an ultrasonic wave toward the bottom of the lower portion of the moving object;
    a receiving unit configured to receive an echo due to the reflection at the measurement target with the ultrasonic wave transmitted from the transmission signal forming unit;
    a correlator configured to discriminate the echo corresponding to the transmission signal by executing a correlating process to the echo by the pseudo noise sequence signal and measure a distance to the measurement target on the basis of a time difference between the transmission signal and the echo; and
    a display apparatus configured to display the echo in synchronization with the transmission signal,
    wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order, and
    wherein in the case where a velocity of a sound wave in the water is equal to Vu and the distance to the measurement target is equal to D, a period of the transmission signal includes a case where it is equal to or less than (2D/Vu).

2. An echo measuring apparatus according to claim 1, wherein noises are reduced by adding the plurality of echoes which are time-sequentially continuous.

3. An echo measuring apparatus according to claim 1, wherein a correlation is detected by data obtained by sampling the echo at a frequency which is two or more times as high as a carrier frequency and the pseudo noise sequence signal.

4. A multibeam echo measuring apparatus which is attached to a moving object and detects a measurement target in the water, comprising:
   a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
   a transmitting unit configured to transmit sequentially the transmission signal as an ultrasonic wave toward the bottom of the lower portion of the moving object;
   a receiving unit configured to receive an echo due to the reflection at the measurement target with the ultrasonic wave transmitted from the transmission signal forming unit;
   a correlator configured to discriminate the echo corresponding to the transmission signal by executing a correlating process to the echo by the pseudo noise sequence signal and measure a distance to the measurement target on the basis of a time difference between the transmission signal and the echo; and
   a display apparatus configured to display the echo in synchronization with the transmission signal,
   wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order, and
   wherein in the case where a velocity of a sound wave in the water is equal to Vu and the distance to the measurement target is equal to D, a period of the transmission signal includes a case where it is equal to or less than (2D/Vu), and
   a number of ultrasonic beams are transmitted in a fan shape by the transmitting unit.

5. An aperture synthetic sonar which is attached to a moving object and detects a measurement target in the water, comprising:
   a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
   a transmitting unit configured to transmit sequentially the transmission signal as an ultrasonic wave toward the bottom of the lower portion of the moving object;
   a receiving unit configured to receive an echo due to the reflection at the measurement target with the ultrasonic wave transmitted from the transmission signal forming unit;
   a correlator configured to discriminate the echo corresponding to the transmission signal by executing a correlating process to the echo by the pseudo noise sequence signal and measure a distance to the measurement target on the basis of a time difference between the transmission signal and the echo; and
   a display apparatus configured to display the echo in synchronization with the transmission signal,
   wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order, and
   wherein in the case where a velocity of a sound wave in the water is equal to Vu and the distance to the measurement target is equal to D, a period of the transmission signal includes a case where it is equal to or less than (2D/Vu), and
   a directivity which is equivalent to that of a transducer of a long aperture is formed by moving a transmitter and a receiver of one set.

6. An echo sounding apparatus which is attached to a moving object and detects a measurement target in the water, comprising:
   a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
   a transmitting unit configured to transmit sequentially the transmission signal as an ultrasonic wave toward the bottom of the lower portion of the moving object;
   a receiving unit configured to receive an echo due to the reflection at the measurement target with the ultrasonic wave transmitted from the transmission signal forming unit;
   a correlator configured to discriminate the echo corresponding to the transmission signal by executing a correlating process to the echo by the pseudo noise sequence signal and obtain depth raw data on the basis of a time difference between the transmission signal and the echo;
   a ship motion correcting unit configured to suppress a ship motion component by executing a ship motion correction to the depth raw data; and
   a display apparatus configured to display the echo in synchronization with the transmission signal,
   wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order, and
   wherein in the case where a velocity of a sound wave in the water is equal to Vu and a distance to the measurement target is equal to D, a period of the transmission signal is equal to or less than (2D/Vu) and satisfies a sampling theory as compared with a period of the ship motion component.

7. An echo measuring apparatus according to claim 6, wherein the ship motion correcting unit eliminates a relatively high frequency component as the ship motion component.

8. An echo measuring apparatus according to claim 6, further comprising a receiving unit configured to receive a ship motion component from a ship motion component detecting apparatus provided for a stationary object, and
wherein in the ship motion correcting unit, the ship motion component received from the depth raw data is cancelled.

9. An echo measuring apparatus according to claim 6, wherein a correlation is detected by data obtained by sampling the echo at a frequency which is two or more times as high as a carrier frequency and the pseudo noise sequence signal.

10. A multibeam echo sounding apparatus which is attached to a moving object and detects a measurement target in the water, comprising:
a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
a transmitting unit configured to transmit sequentially the transmission signal as an ultrasonic wave toward the bottom of the lower portion of the moving object;
a receiving unit configured to receive an echo due to the reflection at the measurement target with the ultrasonic wave transmitted from the transmission signal forming unit;
a correlator configured to discriminate the echo corresponding to the transmission signal by executing a correlating process to the echo by the pseudo noise sequence signal and obtain depth raw data on the basis of a time difference between the transmission signal and the echo;
a ship motion correcting unit configured to suppress a ship motion component by executing a ship motion correction to the depth raw data; and
a display apparatus configured to display the echo in synchronization with the transmission signal,
wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order,
wherein in the case where a velocity of a sound wave in the water is equal to Vu and a distance to the measurement target is equal to D, a period of the transmission signal is equal to or less than (2D/Vu) and satisfies a sampling theory as compared with a period of the ship motion component, and
wherein a number of ultrasonic beams are transmitted in a fan shape by the transmitting unit.

11. An aperture synthetic sonar which is attached to a moving object and detects a measurement target in the water, comprising:
a transmission signal forming unit having a pseudo noise sequence generating circuit for generating a pseudo noise sequence signal synchronously with a transmission trigger pulse and a modulating circuit for forming a transmission signal by modulating a carrier signal by the pseudo noise sequence signal of transmission timing;
a transmitting unit configured to transmit sequentially the transmission signal as an ultrasonic wave toward the bottom of the lower portion of the moving object;
a receiving unit configured to receive an echo due to the reflection at the measurement target with the ultrasonic wave transmitted from the transmission signal forming unit;
a correlator configured to discriminate the echo corresponding to the transmission signal by executing a correlating process to the echo by the pseudo noise sequence signal and obtain depth raw data on the basis of a time difference between the transmission signal and the echo;
a ship motion correcting unit configured to suppress a ship motion component by executing a ship motion correction to the depth raw data; and
a display apparatus configured to display the echo in synchronization with the transmission signal,
wherein in the display apparatus, timing of the transmission trigger pulse is displayed as a transmitting line on an upper side of a screen, a detection signal from the correlator responsive to the transmission trigger pulse is displayed in a state where it is colored, and detection signals corresponding to transmission trigger pulses are displayed so as to be aligned in order, and
wherein in the case where a velocity of a sound wave in the water is equal to Vu and a distance to the measurement target is equal to D, a period of the transmission signal is equal to or less than (2D/Vu) and satisfies a sampling theory as compared with a period of the ship motion component, and
a directivity which is equivalent to that of a transducer of a long aperture is formed by moving a transmitter and a receiver of one set.

12. An echo measuring apparatus according to claim 1, wherein the moving object is a ship.

13. A multibeam echo measuring apparatus according to claim 4, wherein the moving object is a ship.

14. An aperture synthetic sonar according to claim 5, wherein the moving object is a ship.

15. An echo sounding apparatus according to claim 6, wherein the moving object is a ship.

16. A multibeam echo sounding apparatus according to claim 10, wherein the moving object is a ship.

17. An aperture synthetic sonar according to claim 11, wherein the moving object is a ship.

* * * * *